United States Patent
Sagisaka et al.

(10) Patent No.: US 7,677,227 B2
(45) Date of Patent: Mar. 16, 2010

(54) APPARATUS AND METHOD OF ABNORMALITY DIAGNOSIS FOR SUPERCHARGING PRESSURE CONTROL SYSTEM

(75) Inventors: Yasuo Sagisaka, Komaki (JP); Yasuo Mukai, Obu (JP); Masahiko Yamaguchi, Obu (JP); Kuniaki Ueda, Obu (JP)

(73) Assignee: DENSO Corporation, Kariya (JP)

( * ) Notice: Subject to any disclaimer, the term of this patent is extended or adjusted under 35 U.S.C. 154(b) by 174 days.

(21) Appl. No.: 11/478,729

(22) Filed: Jul. 3, 2006

(65) Prior Publication Data

US 2006/0248889 A1 Nov. 9, 2006

(30) Foreign Application Priority Data

Jul. 4, 2005 (JP) ............................. 2005-194963
Sep. 15, 2005 (JP) ............................. 2005-267865

(51) Int. Cl.
F02B 33/00 (2006.01)
(52) U.S. Cl. .................... 123/559.1; 60/600; 60/611
(58) Field of Classification Search .............. 60/600, 60/611; 123/559.1
See application file for complete search history.

(56) References Cited

U.S. PATENT DOCUMENTS

| 4,603,552 | A | * | 8/1986 | Kido | .................. 60/605.1 |
| 5,454,360 | A | | 10/1995 | Shimizu et al. | |
| 5,829,254 | A | * | 11/1998 | Hayashi et al. | .............. 60/602 |
| 5,850,738 | A | * | 12/1998 | Hayashi | .................. 60/602 |
| 5,899,069 | A | * | 5/1999 | Watanabe | ................ 60/602 |
| 5,960,631 | A | * | 10/1999 | Hayashi | ................ 60/602 |
| 6,076,352 | A | * | 6/2000 | Hayashi | ................ 60/602 |
| 6,112,523 | A | * | 9/2000 | Kamo et al. | .................. 60/612 |
| 6,224,021 | B1 | * | 5/2001 | Tanaka | .................. 244/221 |
| 6,751,956 | B2 | * | 6/2004 | Mayer et al. | .................. 60/602 |
| 6,785,604 | B2 | * | 8/2004 | Jacobson | .................... 701/114 |
| 6,968,689 | B2 | * | 11/2005 | Bleile et al. | .................. 60/612 |

(Continued)

FOREIGN PATENT DOCUMENTS

JP 10-18919 1/1998

(Continued)

OTHER PUBLICATIONS

Office Action dated Nov. 25, 2009 issued in corresponding Japanese Application No. 2005-267865 with an at least partial English language translation thereof.

*Primary Examiner*—Thomas Denion
*Assistant Examiner*—Douglas J. Duff
(74) *Attorney, Agent, or Firm*—Nixon & Vanderhye P.C.

(57) ABSTRACT

An opening of a waste gate vale is adjusted to control an actual supercharging pressure of intake air. Abnormality in a changing characteristic of the actual supercharging pressure relative to a change in a TCV control duty value can be detected. When an engine is in a steady operation condition, the TCV control duty value is forcibly changed repeatedly by a predetermined amount from 0% to 100%. A deviation between a target supercharging pressure corresponding to the TCV control duty value and an actual supercharging pressure is calculated each time the TCV control duty value is changed by the predetermined amount. This deviation is compared with an abnormality determination value to determine presence/absence of the abnormality in the changing characteristic of the actual supercharging pressure relative to the change in the TCV control duty value.

20 Claims, 13 Drawing Sheets

U.S. PATENT DOCUMENTS

| | | | |
|---|---|---|---|
| 7,500,363 B2 * | 3/2009 | Hara et al. | 60/611 |
| 2003/0172653 A1 * | 9/2003 | Mayer et al. | 60/602 |
| 2005/0000216 A1 * | 1/2005 | Bleile et al. | 60/611 |
| 2006/0248889 A1 * | 11/2006 | Sagisaka et al. | 60/602 |

FOREIGN PATENT DOCUMENTS

| | | |
|---|---|---|
| JP | 2000-345852 | 12/2000 |
| JP | 2003-328766 | 11/2003 |
| JP | 2004-293442 | 10/2004 |
| JP | 2004-332613 | 11/2004 |

* cited by examiner

APPARATUS AND METHOD OF ABNORMALITY DIAGNOSIS FOR SUPERCHARGING PRESSURE CONTROL SYSTEM

CROSS-REFERENCE TO RELATED APPLICATION

This application is based on Japanese Patent Applications No. 2005-194963 filed on Jul. 4, 2005, and No. 2005-267865 filed on Sep. 15, 2005, the disclosure of which are incorporated herein by reference.

FIELD OF THE INVENTION

The present invention relates to an apparatus and a method of an abnormality diagnosis for a supercharging pressure control system which controls a supercharging pressure of intake air supercharged by a supercharger.

BACKGROUND INFORMATION

There is known an in-vehicle internal combustion engine provided with a supercharger of an exhaust turbine driven type (i.e., turbocharger), aiming at high power output of the engine or the like.

JP-2000-345852A discloses a system which controls a supercharging pressure of intake air supercharged by this supercharger. This system is so structured that a waste gate valve (WGV) is located in an exhaust bypass passage bypassing an exhaust turbine to feedback-control an opening of the WGV in such a manner as to make an actual supercharging pressure detected by a supercharging pressure sensor be equal to a target supercharging pressure for controlling a quantity of an exhaust gas to be supplied to the exhaust turbine. This controls a rotational speed of a compressor rotating integrally with the exhaust turbine to control the actual supercharging pressure to be the target supercharging pressure.

As shown in FIG. 3, in a normal supercharging pressure control system, an actual supercharging pressure varies to some extent in a linear relation with a change in a WGV control signal (control duty value "Duty" of an electromagnetic valve for driving the WGV) for controlling an opening of the WGV. However, in a supercharging pressure control system where a foreign object such as oil adheres inside the electromagnetic valve for driving the WGV, a changing characteristic of the actual supercharging pressure to the change in the WGV control signal varies in a partial region, so that a linearity in the changing characteristic of the actual supercharging pressure to the change in the WGV control signal possibly deteriorates. Occurrence of such an abnormality possibly causes deterioration in controllability of the supercharging pressure control.

The above-mentioned supercharging pressure control system compares a deviation between the actual supercharging pressure and the target supercharging pressure and a feedback correction amount calculated based upon the deviation with respective predetermined determination values to determine presence/absence of failures of components used for the supercharging pressure control. However, since the changing characteristic of the actual supercharging pressure to the change in the WGV control signal is not taken into account at all, it is not possible to detect abnormality (deterioration in linearity or the like) in the changing characteristic of the actual supercharging pressure.

In addition, there is proposed an engine with a supercharger having a structure equipped with a supercharging state varying apparatus for adjusting a supercharging state of the supercharger. As one example, there is the technology in which a bypass passage is located so as to bypass an intake compressor disposed in an intake passage and also an air bypass valve (ABV) as a bypass valve is arranged in the bypass passage. For example, when a throttle valve is operated to be fully closed in a supercharging state by a turbocharger, since pressures in an intake pipe at an upstream side of the throttle valve (throttle-upstream-pressure) excessively increase, the air bypass valve is opened for reduction in pressures in the intake pipe at the upstream side of the throttle valve. On this occasion, opening the air bypass valve results in the solution for various problems such as occurrence of surge noises by the intake compressor or damages of the intake pipe or the like caused by an excessive increase in the throttle-upstream-pressure.

The air bypass valve is generally arranged in such a way that movement of a valve body in the air bypass valve causes the bypass passage to be opened or closed. However, when the valve body is stuck by involvement of foreign objects or attachment of oil or the like, the air bypass valve cannot be operated to be opened (valve-closing abnormality occurs). When such abnormality in the air bypass valve occurs, the throttle-upstream-pressure excessively increases at a fully closed state of the throttle valve, resulting in problems such as occurrence of surge noises or damages of the intake pipe or the like. Therefore, for the solution of the above problems, there is a hope for the technology which is capable of properly detecting abnormality in the air bypass valve at the time of occurrence of the abnormality thereof.

In view of the above, there exists a need for an apparatus and a method of an abnormality diagnosis for a supercharging pressure control system which overcome the above mentioned problems in the conventional art. The present invention addresses this need in the conventional art as well as other needs, which will become apparent to those skilled in the art from this disclosure.

SUMMARY OF THE INVENTION

The present invention is made in view of the above matters, and it is an object of the present invention to provide an apparatus and a method of an abnormality diagnosis for a supercharging pressure control system which is capable of detecting abnormality in a changing characteristic of an actual supercharging pressure.

Further, it is another object of the present invention to provide an apparatus and a method of an abnormality diagnosis for a supercharging pressure control system which properly detects abnormality of a bypass valve for restricting an excessive increase of pressures in an intake pipe at an upstream side of a throttle valve.

For achieving the above objects, a supercharging pressure control system according to an aspect of the present invention is provided with a supercharger for driving a compressor by an exhaust turbine located in an exhaust passage in an internal combustion engine to supercharge intake air and a waste gate valve (hereinafter referred to as WGV) for opening/closing an exhaust bypass passage bypassing the exhaust turbine. In addition, an actual supercharging pressure of the intake air supercharged by the supercharger is controlled by controlling an opening of the WGV. In this arrangement, a WGV control signal for controlling the opening of the WGV is forcibly changed when the internal combustion engine is in a steady operating condition and a determination is made as to presence/absence of abnormality in a changing characteristic of an actual supercharging pressure in relation to the change in the WGV control signal, based upon the then-actual supercharging pressure.

In this way, when the WGV control signal is forcibly changed in a steady operating condition of the internal combustion engine and fluctuation in the then-actual supercharging pressure is monitored, the changing characteristic of the actual supercharging pressure in relation to the change in the WGV control signal can be evaluated, thereby making it possible to determine presence/absence of the abnormality (deterioration in linearity or the like) in the changing characteristic of the actual supercharging pressure in relation to the WGV control signal. As a result, in a case where the abnormality in the changing characteristic of the actual supercharging pressure occurs, it is possible to quickly detect the abnormality.

A passage bypassing the supercharger is provided in an intake system and also a bypass valve is located in the passage, where the bypass valve is opened based upon satisfaction of a predetermined operating condition. In addition, fluctuation in pressures in an intake passage at an upstream side of a throttle valve (throttle-upstream-pressure) is monitored to determine whether or not abnormality of the bypass valve occurs, based upon the fluctuation in the throttle-upstream-pressure after satisfaction of the operating condition. For example, when the throttle valve is fully closed, due to deceleration of a vehicle in a supercharging state of intake air by the supercharger, the operating condition is meant to be met. Alternatively, when the supercharging pressure by the supercharger increases excessively (when the excessive supercharging state occurs), the operating condition is meant to be met. In a case of using an electrically driven bypass valve, a valve opening command is outputted to the bypass valve based upon satisfaction of the operating condition to open the bypass valve by the valve opening command.

If the abnormality occurs in the bypass valve, the bypass valve cannot be opened regardless of the satisfaction of the operating condition (output of the valve opening command in a case of the electrically driven bypass valve). In this case, when the bypass valve is normally opened, the throttle-upstream-pressure changes (reduces) caused by it. However, upon occurrence of the abnormality in the bypass valve, the fluctuation in the throttle-upstream-pressure at the time of occurrence of the abnormality in the bypass valve differs from that at a normal operation thereof. Therefore, it is possible to determine the abnormality in the bypass valve based upon the fluctuation in the throttle-upstream-pressure. According to the aspect of the present invention, protection of the supercharging pressure control system can be achieved by proper recognition of the abnormality in the bypass valve.

BRIEF DESCRIPTION OF THE DRAWINGS

Other objects, features, and advantages of the present invention will become more apparent from the following detailed description made with reference to the accompanying drawings, in which like parts are designated by like reference numbers and in which.

DETAILED DESCRIPTION OF THE PREFERRED EMBODIMENTS

First Embodiment

An abnormality diagnosis apparatus for a supercharging pressure control system in a first embodiment of the present invention will be hereinafter explained with reference to the accompanying drawings.

Figure 1:
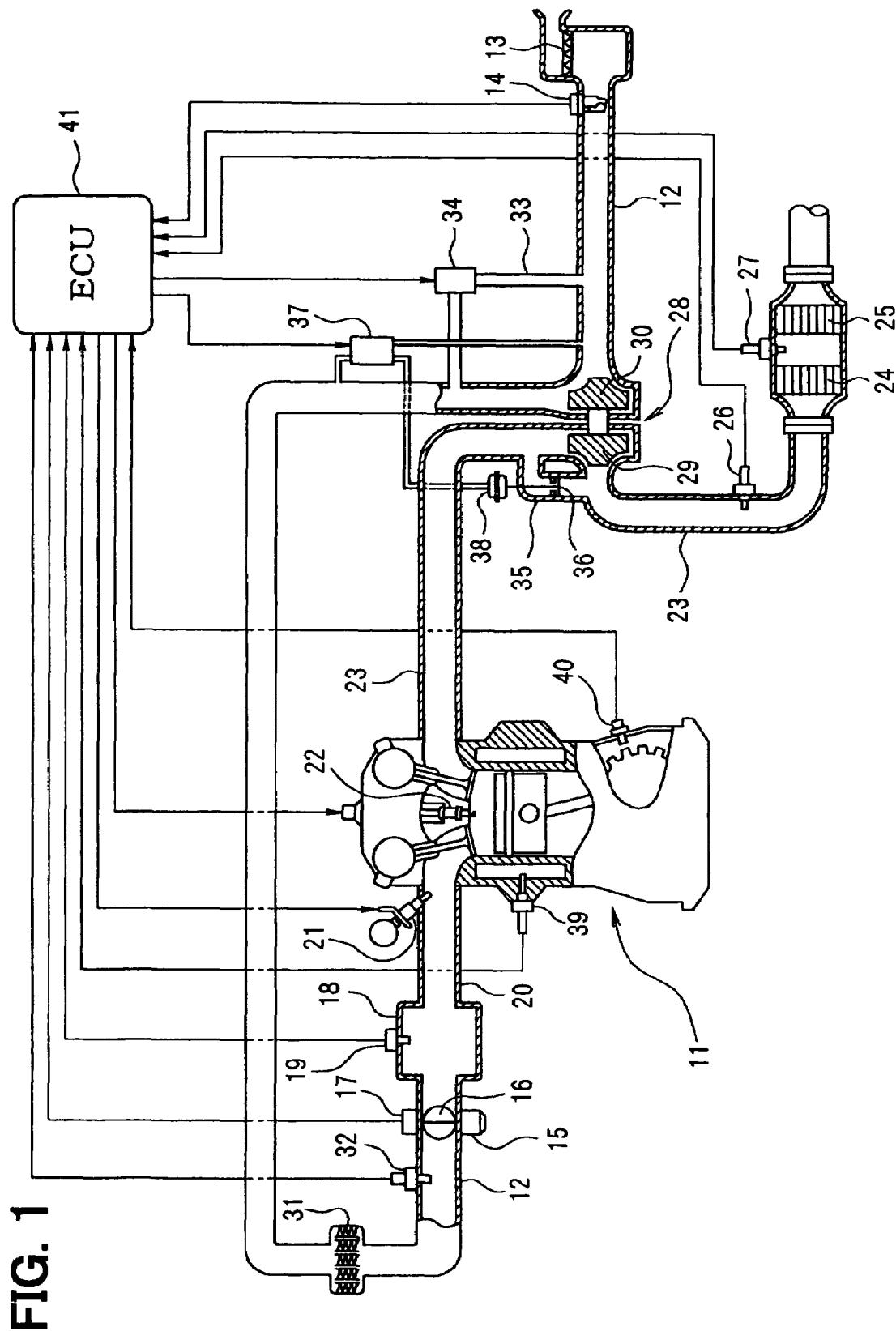
FIG. 1 is a schematic construction diagram showing an entire engine control system in a first embodiment of the present invention.

First, a schematic construction of an entire engine control system will be explained with reference to FIG. 1. An air cleaner 13 is located in the most upstream section of an intake pipe 12 (intake passage) for an engine 11 as an internal combustion engine. An air flow meter 14 for detecting an intake air quantity is located in the intake pipe 12 at the downstream side of the air cleaner 13. A compressor 30 in a supercharger of an exhaust driven type to be described later and an intercooler 31 for cooling intake air pressurized by the compressor 30 are provided in the take pipe 12 at the downstream side of the air flow meter 14. A supercharging pressure sensor 32 for detecting an intake pressure (hereinafter referred to as supercharging pressure) in the intake pipe 12 at the upstream side of a throttle valve 16 is located in the intake pipe 12 at the downstream side of the intercooler 31. An intake temperature sensor may be provided integrally with the supercharging pressure sensor 32. The throttle valve 16 an opening of which is adjusted by a motor 15 and a throttle opening sensor 17 for detecting the opening of the throttle valve 16 (referred to as throttle opening) are located in the intake pipe 12 at the downstream side of the supercharging pressure sensor 32.

Further, a surge tank 18 is located in the intake pipe 12 at the downstream side of the throttle valve 16 and an intake pressure sensor 19 for detecting an intake pressure in the intake pipe 12 at the downstream side of the throttle valve 16 (hereinafter referred to as intake pressure briefly) is provided in the surge tank 18. In addition, an intake manifold 20 for introducing air into each cylinder of the engine 11 is provided in the surge tank 18. A fuel injection valve 21 for injecting fuel toward the intake port in the intake manifold 20 for each cylinder is attached in the vicinity of the intake port. In addition, an ignition plug 22 is attached for each cylinder to a cylinder head of the engine 11 and ignites a mixture in each cylinder by spark discharge thereof.

On the other hand, an upstream catalyst 24 and a downstream catalyst 25 such as a three-way catalyst for purifying an exhaust gas are located inside one catalyst case and are spaced by a predetermined interval therein. A first exhaust gas sensor 26 (an air-fuel ratio sensor, an oxygen sensor or the like) for detecting an air-fuel ratio or a rich/lean state of the exhaust gas is located in the exhaust pipe 23 at the upstream side of the upstream catalyst 24 and a second exhaust gas sensor 27 is located between the upstream catalyst 24 and the downstream catalyst 25 in one catalyst case.

A supercharger 28 of an exhaust turbine driven type is mounted in the engine 11. The supercharger 28 is provided with an exhaust turbine 29 located in the exhaust pipe 23 at the upstream side of the first exhaust gas sensor 26 and the compressor 30 located in the intake pipe 12 between the air flow meter 14 and the throttle valve 16. In the supercharger 28, the exhaust turbine 29 and the compressor 30 are connected to rotate and drive the exhaust turbine 29 by kinetic energy of the exhaust gas, so that the compressor 30 is rotated to supercharge intake air.

Further, an intake bypass passage 33 bypassing the compressor 30 at an upstream side and a downstream side thereof is located in the intake pipe 12 at the upstream side of the throttle valve 16. An air bypass valve 34 for opening/closing the intake bypass passage 33 is located in the half way of the intake bypass passage 33.

On the other hand, an exhaust bypass passage 35 for bypassing the exhaust turbine 29 at an upstream side and a downstream side thereof is located in the exhaust pipe 23 and a waste gate valve 36 (hereinafter referred to as WGV) for opening/closing the exhaust bypass passage 35 is located in the half way of the exhaust bypass passage 35. The WGV 36 duty-controls power supply to a turbine control valve 37 (hereinafter referred to as TCV) constructed of an electromagnetic valve to control an actuator 38 of a diaphragm type, thus controlling an opening of the WGV 36.

In addition, a cylinder block of the engine 11 is equipped with a water temperature sensor 39 for detecting a water temperature and a crank angle sensor 40 for outputting a pulse signal each time a crankshaft of the engine 11 rotates by a predetermined crank angle. A crank angle and an engine rotational speed are detected based upon the output signal of the crank angle sensor 40.

The output of each sensor is inputted to an engine control circuit (hereinafter referred to as ECU) 41. The ECU 41 is constructed mainly of a micro computer and executes various engine control programs stored in a ROM (memory medium) housed therein to control a fuel injection quantity of the fuel injection valve 21 and ignition timing of the ignition plug 22 in accordance with an engine operating condition.

Figure 2:
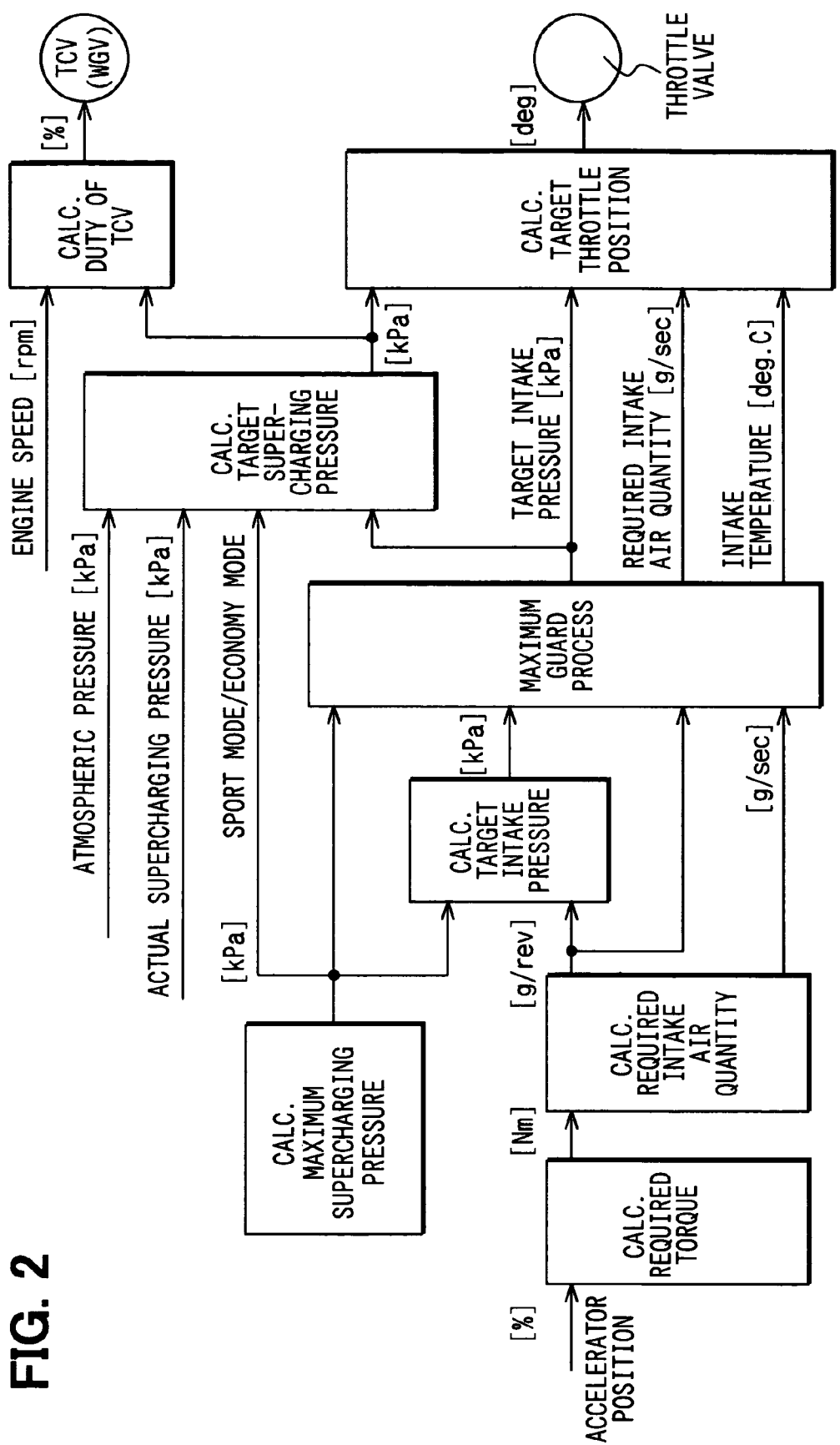
FIG. 2 is a block diagram for explaining torque required control and supercharging pressure control.

In addition, as shown in FIG. 2, the ECU 41, as below, executes torque required control for controlling a throttle opening in such a manner as to realize required torque in accordance with an accelerator position (depression amount of an accelerator pedal) or the like.

First, the required torque is calculated based an accelerator position by a map, a mathematical expression, or the like to convert the required torque into a required intake air quantity. A target intake pressure is calculated based upon this required intake air quantity and a maximum supercharging pressure by a map, a mathematical expression or the like. This target intake pressure and the required intake air quantity each are guard-treated with a maximum guard value corresponding to each maximum supercharging pressure to determine a final target intake pressure and a final required intake air quantity.

Further, a target supercharging pressure is calculated based upon an atmospheric pressure detected by an atmospheric pressure sensor (not shown), an actual supercharging pressure detected by the supercharging pressure sensor 32 and a maximum supercharging pressure by a map, a mathematical expression or the like. At this point, when a driving mode is switched between a sport mode and an economy mode, a map or a mathematical expression for the target supercharging pressure is switched in accordance with the driving mode.

Thereafter, a target throttle position for realizing the required intake air quantity is calculated based upon the target supercharging pressure, the target intake pressure, the required intake air quantity, the intake temperature and the like by a map, a mathematical expression or the like. Then, the throttle valve 16 is feedback-controlled in such a manner that an actual throttle opening be equal to the target throttle opening.

In addition, as shown in FIG. 2, the ECU 41 controls a supercharging pressure of intake air to be supercharged by the supercharger 28. First, after a target supercharging pressure is calculated by the above-described method, a TCV control duty value (control duty value of the TCV 37) "Duty" for realizing the target supercharging pressure is calculated by a map or a mathematical expression based upon the target supercharging pressure, an engine rotational speed and the like. The power supply to the TCV 37 is duty-controlled with the TCV control duty value "Duty" to control an opening of the WGV 36, thereby controlling an exhaust gas quantity supplied to the exhaust turbine 29, so that a rotational speed of the compressor 30 rotating integrally with the exhaust turbine 29 to control an actual supercharging pressure to be equal to the target supercharging pressure.

Figure 3:
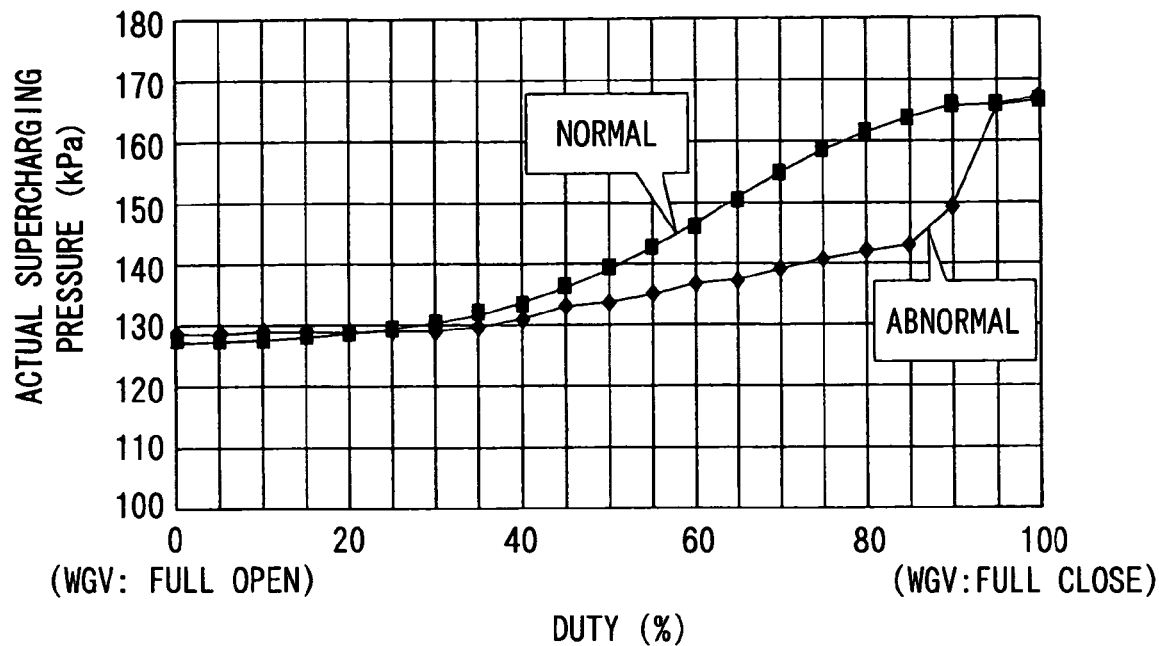
FIG. 3 is a graph showing a changing characteristic in an actual supercharging pressure in relation to a change in a duty value of a turbine control valve.

As shown FIG. 3, in a normal supercharging pressure control system, an actual supercharging pressure changes in a certain degree of linearity relative to a change of a TCV control duty value "Duty". However, for example, in a supercharging pressure control system in which foreign objects such as oil adhere inside the TCV 37 driving the WGV 36, a changing characteristic in an actual supercharging pressure relative to a change of a TCV control duty value is forced to be changed in a partial region, so that linearity in the changing characteristic in the actual supercharging pressure relative to the change of the TCV control duty value "Duty" is likely to be deteriorated.

Therefore, the ECU 41 executes each routine for an abnormality diagnosis in a supercharging pressure control system in FIGS. 4 to 7, which will be described later. Thereby, when the engine 11 is in a steady operating condition, a TCV control duty value "Duty" is forcibly changed from 0% (a value corresponding to a fully opened position of the WGV 36) to 100% (a value corresponding to a fully closed position of the WGV 36) by a predetermined amount "a". Each time the TCV control duty value "Duty" is changed by a predetermined amount "a", a deviation ΔP between a target supercharging pressure Ptbp corresponding to the TCV control duty value "Duty" and an actual supercharging pressure Pabp is calculated. By comparing an absolute value of the deviation ΔP with a predetermined abnormality determination value TP, presence/absence of abnormality (decrease in linearity or the like) in a changing characteristic of the actual supercharging pressure Pabp relative to a change in the TCV control duty value "Duty" is determined.

If the supercharging pressure control system is in a normal state, when the TCV control duty value "Duty" is forcibly changed to change an opening of the WGV 36, the actual supercharging pressure Pabp is substantially equal to the target supercharging pressure Ptbp corresponding to the TCV control duty value "Duty". Therefore, each time the TCV control duty value "Duty" is changed by a predetermined amount "a", a deviation ΔP between a target supercharging pressure Ptbp (a value corresponding to an actual supercharging pressure in a normal system) corresponding to the TCV control duty value "Duty" and an actual supercharging pressure Pabp is compared with the abnormality determination value TP. As a result, presence/absence of abnormality (decrease in linearity or the like) in a changing characteristic of the actual supercharging pressure Pabp relative to a change in the TCV control duty value can be accurately determined.

As described in the abnormality diagnosis in the first embodiment, when the TCV control duty value "Duty" is forcibly changed to change an opening of the WGV 36, the actual supercharging pressure Pabp is changed to provide for an intake air quantity to change, thereby providing possible occurrence of torque fluctuations. According to the first embodiment, however, the above-mentioned torque required control is executed and therefore, even if the TCV control duty value "Duty" is forcibly changed for the abnormality diagnosis to provide for an opening of the WGV 36 to change, a target throttle opening or the like is automatically corrected by the torque required control in a such a manner that the torque change due to the change in the opening of the WGV 36 does not occur (that is, such that the required torque is maintained), thus preventing occurrence of the torque fluctuation.

In addition, for securely detecting abnormality of a changing characteristic in an actual supercharging pressure Pabp relative to a change in a TCV control duty value "Duty", it is preferable that a changing region upon forcibly changing the TCV control duty value "Duty" is widened as much as possible (for example, an opening of the WGV 36 changes over a region from a substantially fully closed position to a substantially fully opened position). However, when the engine is in a low-load region or a low rotational speed region, the throttle opening is already small and degrees of correction for reduction in the throttle opening are not sufficiently left. Therefore, it is possible that a torque increment when the opening of the WGV 36 is reduced to be small is not canceled out by a torque decrement when the throttle opening is corrected to be reduced. On the other hand, when the engine is in a high-load region or a high rotational speed region, the throttle opening is already large and degrees of correction for an increase in the throttle opening are not sufficiently left. Therefore, it is possible that a torque decrement when the opening of the WGV 36 is increased to be large is not canceled out by a torque increment when the throttle opening is corrected to be increased.

Therefore, when the engine 11 is in an intermediate-load region and an intermediate-rotational speed region and also in a steady operating condition, the ECU 41 forcibly changes a TCV control duty value "Duty" to execute an abnormality diagnosis for a changing characteristic of an actual supercharging pressure Pabp. This is because when the engine is in an intermediate-load region and an intermediate-rotational speed region, the throttle opening is in an intermediate region and therefore, degrees of correction for both an increase and a decrease in the throttle opening are sufficiently left. Therefore, a torque increment when an opening of the WGV 36 is reduced to be small can be canceled out by a torque decrement when the throttle opening is corrected to be reduced and also a torque decrement when an opening of the WGV 36 is increased to be large can be canceled out by a torque increment when the throttle opening is corrected to be increased.

The abnormality diagnosis in the supercharging pressure control system as described above is executed by the ECU 41 according to each routine for the abnormality diagnosis in the supercharging pressure control system shown in FIGS. 4 to 7. A process content in each routine will be hereinafter explained.

[Determination Routine for Steady State]

Figure 4:
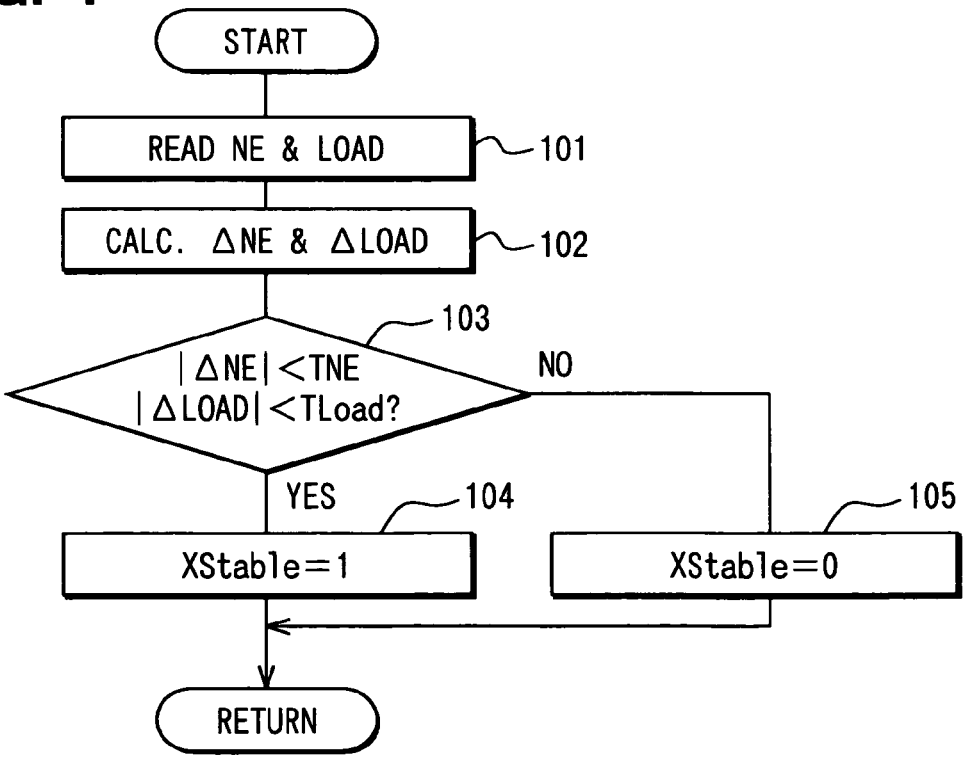
FIG. 4 is a flow chart showing a flow of processes in a steady state determining routine.

A determination routine for a steady state shown in FIG. 4 is executed in a predetermined cycle during power-ON. When this routine is activated, first at step 101, an engine rotational speed NE detected by the crank angle sensor 40 and an engine load LOAD (intake air quantity or intake pressure) detected by an air flow meter 14 or an intake pressure sensor 19 are read in. Then, the process goes to step 102, wherein a changing amount ΔNE (for example, a difference between this time's value and the previous value of the engine rotational speed NE) of the engine rotational speed and a changing amount ΔLOAD (for example, a difference between this time's value and the previous value of the engine load) of the engine load are calculated.

Thereafter, the process goes to step 103, wherein a determination is made as to whether or not an absolute value of the changing amount ΔNE of the engine rotational speed is smaller than a steady-state determination value TNE and also a determination is made as to whether or not an absolute value of the changing amount ΔLOAD of the engine load is smaller than a steady-state determination value TLoad.

As a result, when it is determined that the absolute value of the changing amount ΔNE of the engine rotational speed is smaller than the steady-state determination value TNE and also the absolute value of the changing amount ΔLOAD of the engine load is smaller than the steady-state determination value TLoad, the process goes to step 104, wherein a steady-state determination flag XS table is set as "1", which means that the engine 11 is in a steady operation condition.

On the other hand, when it is determined that the absolute value of the changing amount ΔNE of the engine rotational speed is larger than the steady-state determination value TNE or the absolute value of the changing amount ΔLoad of the engine load is larger than the steady-state determination value TLoad, the process goes to step 105, wherein a steady-state determination flag XS table is set as "0", which means that the engine 11 is in a transient operation condition.

In addition, in this routine, whether or not the engine 11 is in a steady operation condition is determined based upon a changing amount of an engine rotational speed and a changing amount of an engine load, but not limited thereto, whether or not the engine 11 is in a steady operation condition may be determined based upon a changing amount of an accelerator position, a changing amount of required torque, a changing amount of a required intake air quantity, a changing amount of a required intake pressure or the like. In this way, a determination method as to whether or not the engine 11 is in a steady operation condition may be modified as needed.

[Determination Routine for Forcible Opening/Closing Mode of WGV]

Figure 5:
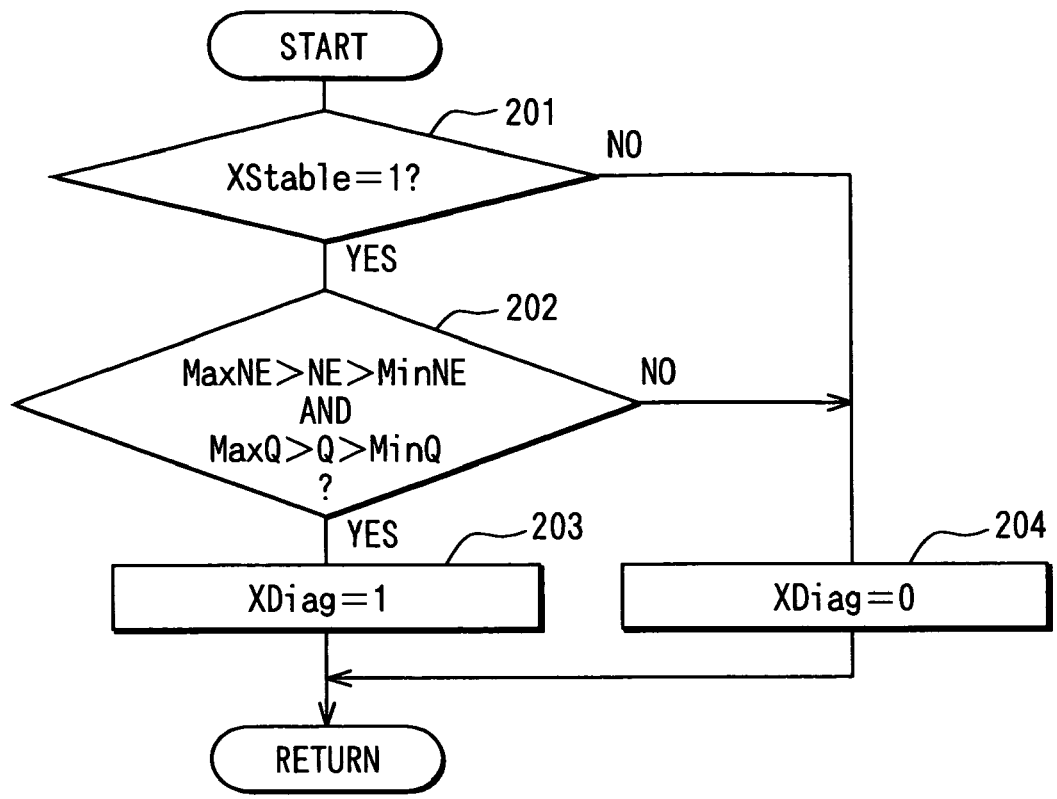
FIG. 5 is a flow chart showing a flow of processes in a determining routine for a forcible opening/closing mode of a waste gate valve.

A determination routine for a forcible opening/closing mode shown in FIG. 5 is executed in a predetermined cycle during power-ON. When this routine is activated, first at step 201, it is determined whether or not the engine 11 is in a steady operation condition based upon whether or not the steady-state determination flag XS table is set as "1".

As a result, when it is determined that the engine 11 is in a steady operation condition (XS table=1), the process goes to step 202, wherein it is determined whether or not the engine 11 is in an intermediate rotational speed region based upon whether or not an engine rotational speed NE detected by the crank angle sensor 40 is within a predetermined range (Max NE>NE>Min NE) and also it is determined whether or not the engine 11 is in an intermediate load region based upon whether or not an intake air quantity Q detected by the air flow meter 14 is within a predetermined range (Max Q>Q>Min Q).

At step 202, it is determined that the engine 11 is in an intermediate rotational speed region and also the engine 11 is in an intermediate load region, the process goes to step 203, wherein a forcible opening/closing mode flag XDiag of the WGV is set as "1", which means that the system is in a WGV forcible opening/closing mode permitting the WGV 36 to be forcibly opened/closed.

On the other hand, at step 202, when it is determined that the engine 11 is not in an intermediate rotational speed region or the engine 11 is not in an intermediate load region, the process goes to step 204, wherein a WGV forcible opening/closing mode flag XDiag is set as "0", which means that the system is not in the WGV forcible opening/closing mode.

[Operation Routine for Execution Flag of Abnormality Diagnosis]

Figure 6:
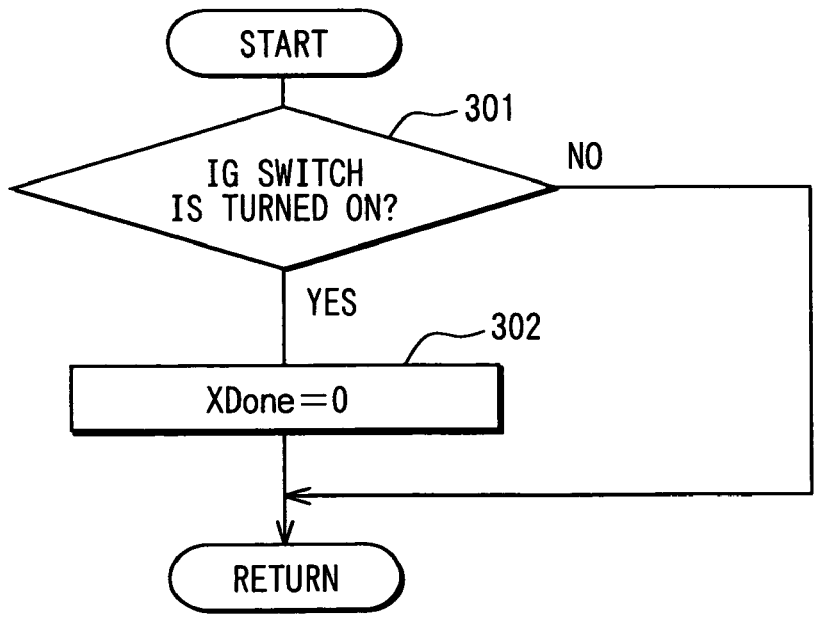
FIG. 6 is a flow chart showing a flow of processes in an operation routine of an execution flag for an abnormality diagnosis.

An operation routine for an execution flag of an abnormality diagnosis shown in FIG. 6 is executed in a predetermined cycle during power-ON. When this routine is activated, first at step 301, it is determined whether or not an ignition switch (IG switch) (not shown) is switched from OFF to ON. When the IG switch is switched from OFF to ON, the process goes to step 302, wherein an execution flag XDone of the abnormality diagnosis is set as "0", which means that the abnormality diagnosis in the supercharging pressure control system is not executed yet during this time's trip (during ON of the IG switch).

[Abnormality Diagnosis Routine for Supercharging Pressure Control System]

Figure 7:
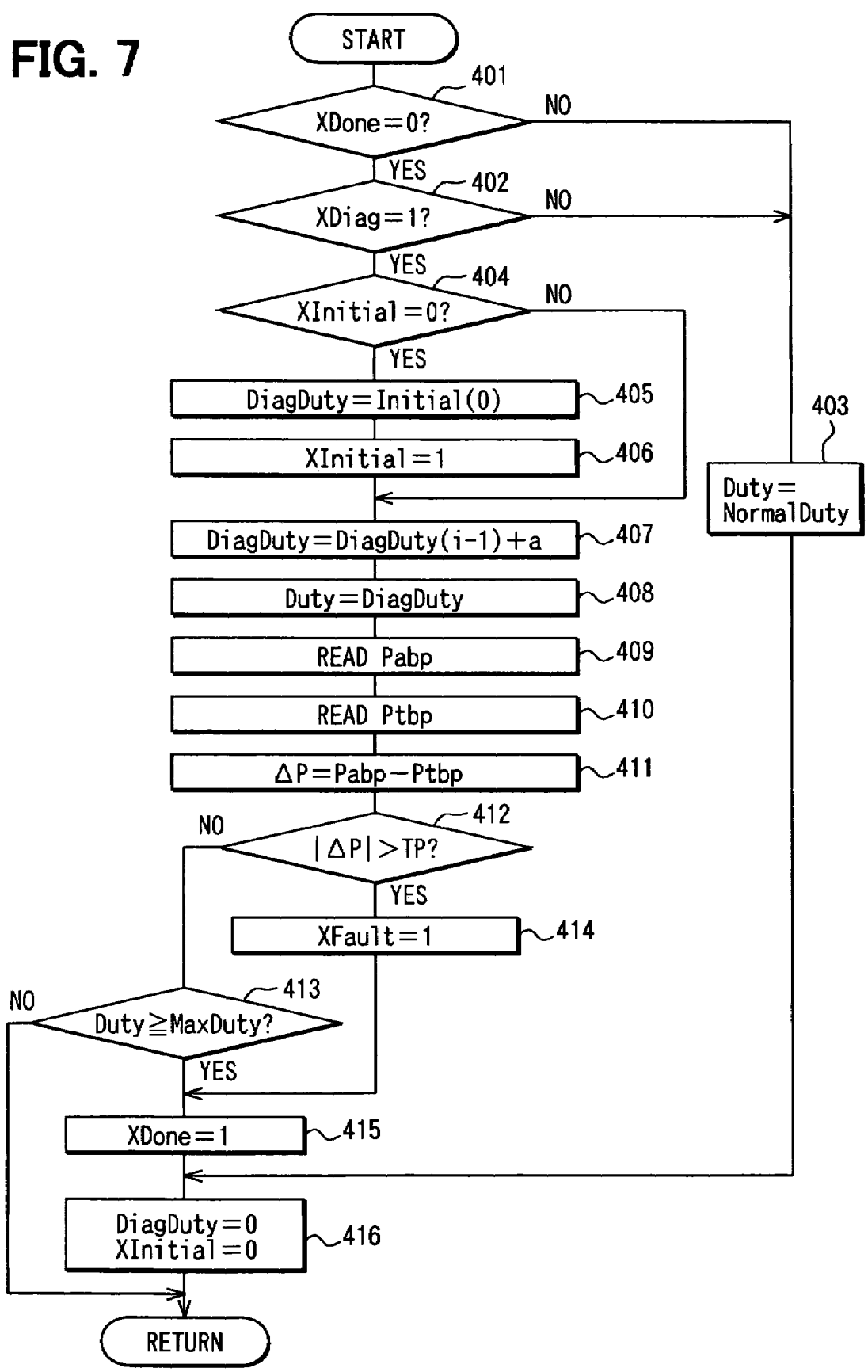
FIG. 7 is a flow chart showing a flow of processes in an abnormality diagnosis routine for a supercharging pressure control system.

An abnormality diagnosis routine for a supercharging pressure control system shown in FIG. 7 is executed in a predetermined cycle during power-ON and serves as abnormality diagnosis means. When this routine is activated, first at step 401, it is determined whether or not an abnormality diagnosis in the supercharging pressure control system is executed during this time's trip, based upon whether or not an execution flag XDone of the abnormality diagnosis is set as "0". Then, at next step 402, it is determined whether or not the system is in a WGV forcible opening/closing mode permitting the WGV 36 to be forcibly opened/closed, based upon whether or not a WGV forcible opening/closing mode flag XDiag is set as "1".

When it is determined at step 401 that the abnormality diagnosis for the supercharging pressure control system is already once executed during this time's trip (XDone=1), or when it is determined at step 402 that the system is not in a WGV forcible opening/closing mode (XDiag=0), processes with reference to the abnormality diagnosis for the supercharging pressure control system subsequent to step 404 are not executed, and the process goes to step 403, wherein the TCV control duty value "Duty" is returned back to a normal duty value or is maintained. On this occasion, when the TCV control duty value "Duty" is returned back from a duty value "Diag Duty" for WGV forcible opening/closing to be described later to a normal duty value, the TCV control duty value "Duty" is annealed to be gradually closer to the normal duty value.

On the other hand, when it is determined at step 401 that the abnormality diagnosis for the supercharging pressure control system is not executed once yet during this time's trip (XDone=0) and also when it is determined at step 402 that the system is in the WGV forcible opening/closing mode (XDiag=1), processes with reference to the abnormality diagnosis for the supercharging pressure control system subsequent to step 404 are executed as follows.

First, at step 404 it is determined whether or not an initial determination flag XInitial is set as "0". At the time of starting the process in regard to the abnormality diagnosis of the supercharging pressure control system, the initial flag XInitial is set as "0" and therefore, it is determined at step 404 that "Yes" is determined. Then, the process goes to step 405, wherein a duty value "Diag Duty" for the WGV forcible opening/closing is set as an initial value "Initial" (for example, 0%). Thereafter, the process goes to step 406, wherein the initial determination flag XInitial is set as "1" and then the process goes to step 407.

After at step 406, the initial determination flag XInitial is set as "1", "No" is determined at step 404. Then, the process skips step 405 and step 406, and goes to step 407.

At step 407, a duty value "Diag Duty" for the WGV forcible opening/closing is incremented by a predetermined amount "a" and thereafter, the process goes to step 408, wherein the TCV control duty value "Duty" is set as the duty value "Diag Duty" for the WGV forcible opening/closing. Thereby, the TCV control duty value "Duty" is forcibly incremented by a predetermined value "a".

Thereafter, the process goes to step 409, wherein an actual supercharging pressure Pabp detected by the supercharging pressure sensor 32 is read in. Then, the process goes to step 410, wherein a target supercharging pressure Ptbp (a value corresponding to an actual supercharging pressure in a normal system) corresponding to the TCV control duty value "Duty" is read in.

Thereafter, the process goes to step 411, wherein a deviation ΔP between the actual supercharging pressure Pabp and the target supercharging pressure Ptbp is calculated. Then, the process goes to step 412, wherein it is determined whether or not an absolute value of the deviation ΔP between the actual supercharging pressure Pabp and the target supercharging pressure Ptbp is greater than an abnormality determination value TP.

As a result, when it is determined at step 412 that the absolute value of the deviation ΔP between the actual supercharging pressure Pabp and the target supercharging pressure Ptbp is less than the abnormality determination value TP, the process goes to step 413, wherein it is determined whether or not the TCV control duty value "Duty" reaches a maximum value "Max Duty" (for example 100%).

When at this step 413, it is determined that the TCV control duty value "Duty" is smaller than the maximum value "Max Duty", the steps 401 to 412 are repeatedly executed until the TCV control duty value "Duty" reaches the maximum value "Max Duty". That is, each time the TCV control duty value "Duty" is forcibly incremented by a predetermined amount "a", the process for determining whether or not an absolute value of the deviation value ΔP between the actual supercharging pressure Pabp and the target supercharging pressure Ptbp is greater than the abnormality determination value TP is repeated.

When it is determined at step 412 that the absolute value of the deviation value ΔP between the actual supercharging pressure Pabp and the target supercharging pressure Ptbp is greater than the abnormality determination value TP before it is determined at step 413 that the TCV control duty value "Duty" reaches the maximum value "Max Duty", it is determined that there occurs the abnormality (reduction in linearity or the like) in the changing characteristic of the actual supercharging pressure Pabp relative to the change in the TCV control duty value "Duty". Then, the process goes to step 414, wherein an abnormality determination flag "Fault" is set as "1". Thereafter, the process goes to step 415, wherein the execution flag "XDone" for the abnormality diagnosis is set as "1". At next step 416, the duty-value "Diag Duty" for the WGV forcible opening/closing is reset as "0" and also the initial determination flag "XInitial is reset as "0". This routine ends.

In contrast, when it is not determined at step 412 that the absolute value of the deviation ΔP between the actual supercharging pressure Pabp and the target supercharging pressure Ptbp is greater than the abnormality determination value TP and at step 413, it is determined that the TCV control duty value "Duty" reaches a maximum value "Max Duty", it is determined that there occurs no abnormality in the changing characteristic of the actual supercharging pressure Pabp relative to the change in the TCV control duty value "Duty" (normal). Then, the process goes to step 415, wherein the execution flag "XDone" for the abnormality diagnosis is set as "1". At next step 416, the duty value "Diag Duty" for the WGV forcible opening/closing is reset as "0" and also the initial determination flag "XInitial" is reset as "0". Then, this routine ends.

According to the first embodiment as described above, when the engine 11 is in a steady operating condition, the TCV control duty value "Duty" is forcibly incremented by a predetermined amount "a". Each time the TCV control duty value "Duty" is forcibly incremented by the predetermined amount "a", the absolute value of the deviation ΔP between the target supercharging pressure Ptbp corresponding to the TCV control duty value "Duty" and the actual supercharging pressure Pabp is compared with the abnormality determination value TP to determine presence/absence of the abnormality in the changing characteristic (reduction in linearity or the like) of the actual supercharging pressure Pabp relative to the TCV control duty value "Duty". Therefore, the presence/absence of the abnormality in the changing characteristic of the actual supercharging pressure Pabp can be accurately determined and upon occurrence of the abnormality in the changing characteristic of the actual supercharging pressure Pabp (reduction in linearity or the like), it is possible to quickly detect the abnormality.

In addition, according to the first embodiment, since torque required control is executed, even when the TCV control duty value "Duty" is forcibly changed at the time of executing abnormality diagnosis to change an opening of the WGV 36, a target throttle opening is automatically corrected by the torque required control in a such a manner that a torque change due to the change in the opening of the WGV 36 does not occur (that is, the required torque is maintained), thus preventing occurrence of torque fluctuations and leading to an improvement in drivability at the time of executing abnormality diagnosis.

Further, in the first embodiment, when the engine 11 is in an intermediate-load region and an intermediate-rotational speed region, the throttle opening is in an intermediate region and therefore, degrees of correction for both an increase and a decrease in the throttle opening are sufficiently left. As a result, a torque changing amount when an opening of the WGV 36 is changed can be securely canceled out by a torque changing amount when the throttle opening is corrected to be reduced or to be increased. By focusing attention on the above, when the engine 11 is in an intermediate-load region and an intermediate-rotational speed region, the abnormality diagnosis in the changing characteristic of the actual supercharging pressure Pabp is executed by forcibly changing the TCV control duty value "Duty". Accordingly, at the time of executing the abnormality diagnosis, occurrence of the torque fluctuations can be prevented while widening a changing region of the TCV control duty value "Duty" (an opening of the WGV 36 is changed substantially from a fully closed position to a fully opening position). As a result, upon occurrence of the abnormality in the changing characteristic of the actual supercharging pressure Pabp, the abnormality can be securely detected.

In the first embodiment as described above, each time the TCV control duty value "Duty" is forcibly incremented by the predetermined amount "a", the absolute value of the deviation ΔP between the target supercharging pressure Ptbp corresponding to the TCV control duty value "Duty" and the actual supercharging pressure Pabp is compared with the abnormality determination value TP to determine presence/absence of abnormality in the changing characteristic (reduction in linearity or the like) of the actual supercharging pressure Pabp relative to the TCV control duty value "Duty". However, an abnormality determination method in a changing characteristic of an actual supercharging pressure Pabp may be altered as needed.

Figure 8:
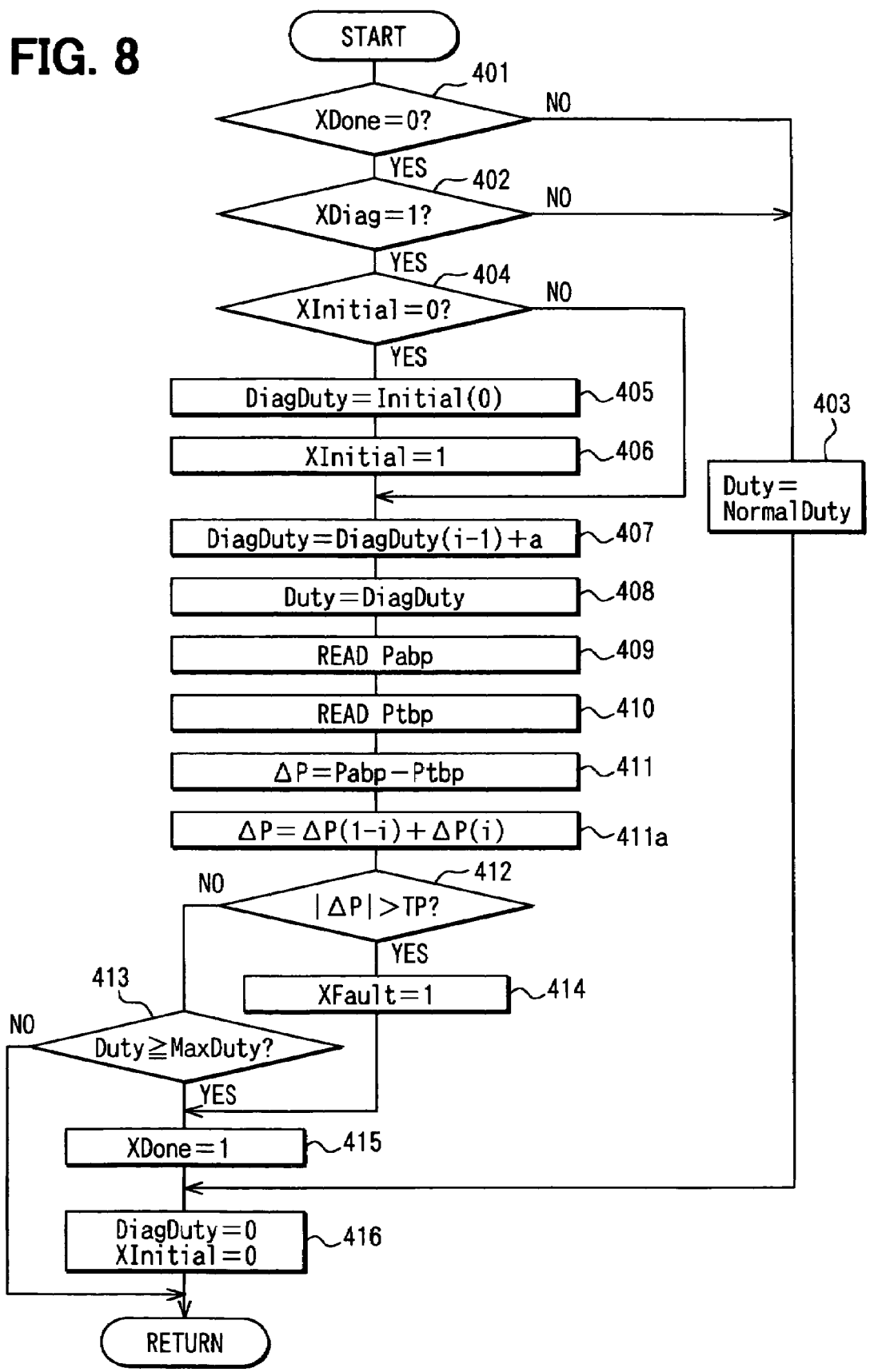
FIG. 8 is a flow chart showing a flow of processes in an abnormality diagnosis routine for a supercharging pressure control system in a modification of the first embodiment.

For example, as shown in FIG. 8, after a deviation ΔP between an actual supercharging pressure Pabp and a target supercharging pressure Ptbp is calculated at step 411, the process goes to step 411a, wherein an integrated value ΔP[ΔP=ΔP(i−1)+ΔP(i)] is obtained by integrating a deviation ΔP(i−1) at the previous time and a deviation ΔP(i) at this time. By comparing an absolute value of this integrated value ΔP with an abnormality determination value TP, presence/absence of abnormality in the changing characteristic of the actual supercharging pressure Pabp relative to the change of the TCV control duty value "Duty" may be determined.

In a routine in FIG. 8, the integrated value ΔP of the deviation ΔP(i−1) at the previous time and the deviation ΔP(i) at this time is obtained. However, an integrated value ΔP of from the deviation before the previous time to the deviation at this time may be obtained. An integrated value ΔP of from the deviation at start of a forcible change of a TCV control duty value "Duty" to the deviation at this time may be obtained.

In addition, each time the TCV control duty value "Duty" is forcibly incremented by a predetermined amount "a", a changing amount or a changing rate of an actual supercharging pressure Pabp may be compared with an abnormality determination value TP to determine presence/absence of abnormality in the changing characteristic of the actual supercharging pressure Pabp relative to the TCV control duty value "Duty".

Further, in the first embodiment, the TCV control duty value "Duty" itself is forcibly changed, but the target supercharging pressure Ptbp may be forcibly changed to change the TCV control duty value "Duty".

In addition, in the first embodiment, the present invention is applied to a system for executing torque required control. However, in a case of a system where the torque required control is not executed, a torque correction for correcting control parameters of the engine 11 may be executed in such a manner as to restrict torque fluctuations upon forcibly changing the TCV control duty value "Duty". In this way, even in the system where the torque required control is not executed, when the TCV control duty value "Duty" is forcibly changed at the time of executing the abnormality diagnosis to change an opening of the WGV 36, control parameters of the engine 11 (for example, a target throttle opening or the like) are corrected in such a manner as to cancel out a torque changing amount due to a change in the opening of the WGV 36, thereby preventing occurrence of the torque fluctuations and improving drivability.

In addition, in the first embodiment as described above, the present invention is applied to the system where the TCV 37 (electromagnetic valve) is controlled to control an opening of the WGV 36, but the present invention may be applied to a system for directly controlling a WGV formed of an actuator electrically controllable such as an electromagnetic valve to determine presence/absence of abnormality in a changing characteristic of an actual supercharging pressure relative to a change in a control signal inputted to the WGV.

Second Embodiment

A schematic construction diagram of an entire engine control system will be explained with reference to FIG. 9.

Figure 9:
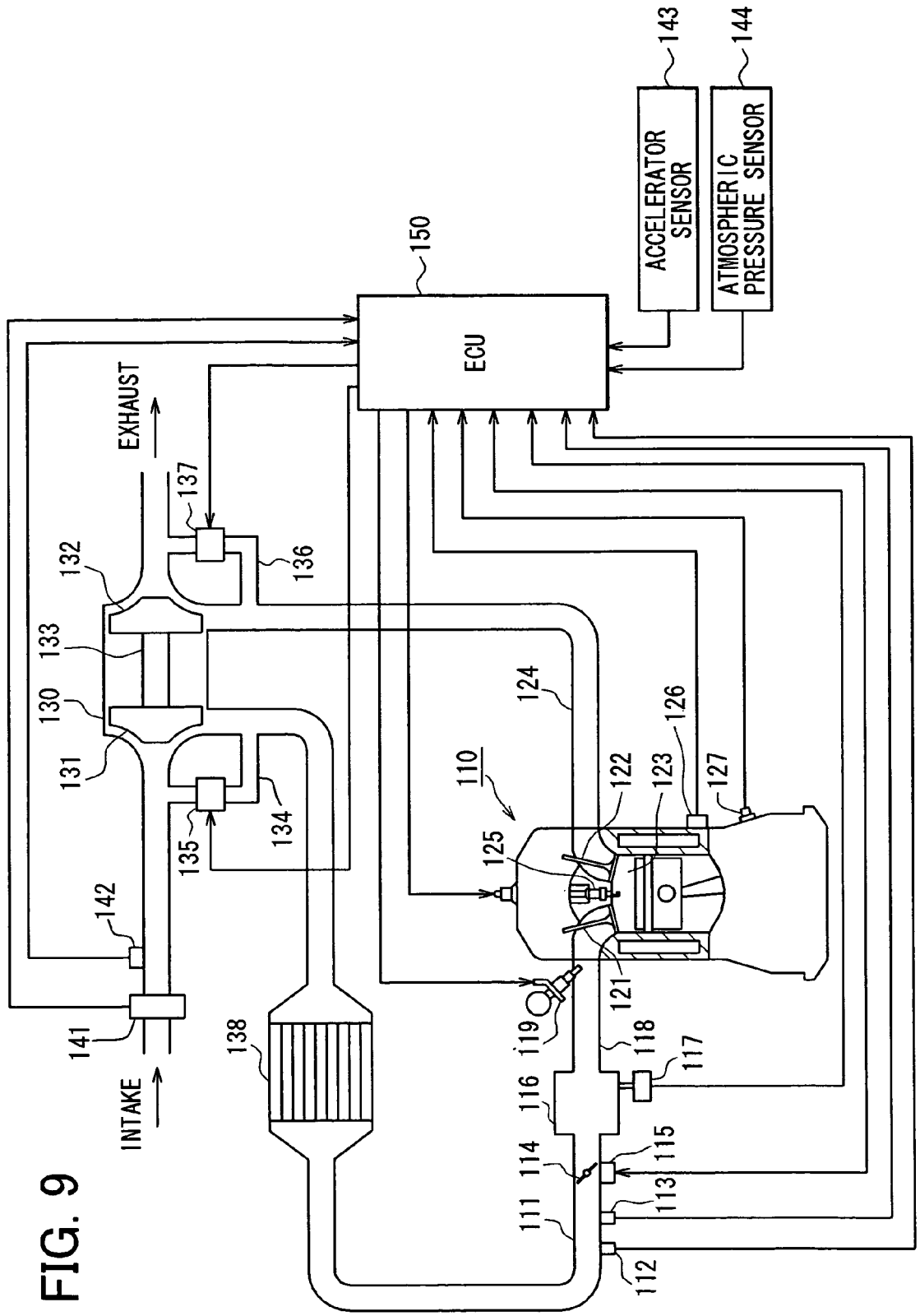
FIG. 9 is a schematic construction diagram showing an entire engine control system in a second embodiment of the present invention.

In an engine 110 shown in FIG. 9, a throttle valve 114 as air quantity adjusting means is located in an intake pipe 111 and an opening of the throttle valve 114 is adjusted by a throttle actuator 115 such as a DC motor. A throttle opening sensor for detecting an opening of the throttle valve 114 (throttle opening) is housed in the throttle actuator 115. A supercharging pressure sensor 112 and an intake temperature sensor 113 are located at an upstream side of the throttle valve 114. The supercharging pressure sensor 112 detects a pressure (a supercharging pressure by a turbocharger to be described later) at the upstream side of the throttle valve 114. The intake temperature sensor 113 detects an intake temperature at the upstream side of the throttle valve 114.

A surge tank 116 is located downstream of the throttle valve 114 and an intake pressure sensor 117 for detecting an intake pressure downstream of the throttle valve 114 is located in the surge tank 116. In addition, an intake manifold 118 for introducing air into each cylinder of the engine 110 is connected to the surge tank 116. A fuel injection valve 119 of an electromagnetic driven type for injecting and supplying fuel is attached to the vicinity of an intake port of each cylinder in the intake manifold 118.

An intake valve 121 and an exhaust valve 122 are located in the intake port and an exhaust port of the engine 110 respectively. A mixture of air and fuel is introduced into a combustion chamber 123 by an opening operation of the intake valve 121 and an exhaust gas after combustion is discharged into an exhaust pipe 124 by an opening operation of the exhaust valve 122. An ignition plug 125 is attached to a cylinder head of the engine 110 in each cylinder. High voltage is applied to the ignition plug 125 at desired ignition timing through an ignition device (not shown) formed of an ignition coil or the like. This application of the high voltage generates spark discharge between opposing electrodes of each ignition plug 125 to ignite the mixture introduced into the combustion chamber 123 for combustion.

A water temperature sensor 126 for detecting a temperature of engine water and a crank angle sensor 127 for outputting a triangular crank angle signal at each predetermined crank angle (for example, at 30° CA cycle) due to rotation of the engine 110 are attached to a cylinder block of the engine 110.

A turbocharger 130 is located between the intake pipe 111 and the exhaust pipe 124. The turbocharger 130 includes a compressor impeller 131 provided in the intake pipe 111 and a turbine wheel 132 provided in the exhaust pipe 124. The compressor impeller 131 and the turbine wheel 132 are coupled through a rotational axis 133. A bypass passage 134 is located so as to bypass the compressor impeller 131 for connecting an upstream side and a downstream side between the compressor impeller 131 in the intake pipe 111. An air bypass valve (ABV) 135 is located in the bypass passage 134. A bypass passage 136 is located so as to bypass the turbine wheel 132 for connecting an upstream side and a downstream side between the turbine wheel 132 in the exhaust pipe 124. A waste gate valve (WGV) 137 is located in the bypass passage 136.

In the turbocharger 130, the turbine wheel 132 is rotated by exhaust gases flowing in the exhaust pipe 124 and the rotational force is transmitted to the compressor impeller 131 through the rotational axis 133. In addition, the intake air flowing in the intake pipe 111 is compressed by the compressor impeller 131 for the supercharging. In this case, the pressure of the compressed intake air downstream of the turbocharger 130 is reduced by opening the air bypass valve 135 to restrict an excessive increase in the supercharging pressure (excessive increase in the throttle-upstream-pressure). Further, Opening the waste gate valve 137 prevents occurrence of the excessive supercharging pressure.

The air bypass valve 135 is formed of a known electromagnetic driven structure of a normal-closed type a valve body of which moves with an electrical signal (power supply) supplied to an electromagnetic driven section thereof to open/close the bypass valve 135 by the movement of the valve body.

The air supercharged by the supercharger 130 is cooled by the intercooler 138, which thereafter, is supplied to the downstream side thereof. A charging efficiency of the intake air is increased by cooling the intake air with the intercooler 138.

An air flow meter 141 for detecting an intake air quantity and an intake air temperature sensor 142 for detecting an intake air temperature at an upstream side of the intake pipe 111 are located at the upstream side of the turbocharger 130. Besides, in this control system an accelerator positioning sensor 143 for detecting a stepped amount (accelerator position) of an accelerator pedal by a driver and an atmospheric pressure sensor 144 for detecting an atmospheric pressure are located.

An ECU 150 is, as well known, formed mainly of a microcomputer including a CPU, a ROM, a RAM and the like, and executes various control programs stored in the ROM to execute various controls of the engine 11 in accordance with an engine operating condition at each moment. That is, the detection signals are inputted to the ECU 150 from the above-mentioned various sensors respectively. The ECU 150 calculates a fuel injection quantity, ignition timing or the like based upon various detection signals to be inputted as needed and controls an operation of the fuel injection valve 119 or the ignition plug 125.

The ECU 150 calculates a target throttle valve opening based upon various detection signals and drives the throttle actuator 115 based upon the target throttle valve opening to execute a desired air quantity control. In this case, particularly a target air quantity is calculated based upon an accelerator position or the like and also a target throttle valve opening is calculated based upon the target air quantity as a parameter to control a throttle valve opening based upon the target throttle valve opening.

Further, the ECU 150, when the throttle valve 114 is controlled to be in a fully closed for deceleration of a vehicle in a state where supercharging is performed by the turbocharger 130 (under a supercharging state), outputs an electrical signal to the air bypass valve 135 to open the air bypass valve 135. In this way, even if the throttle valve 114 is fully closed under the supercharging state, the problems such as occurrence of surge noises or damages of the intake pipe caused by an excessive increase in the throttle-upstream-pressure are not raised.

In addition, when an abnormal operation of the air bypass valve 135 occurs due to the sticking of the valve body thereof, the air bypass valve 135 does not operate (open) even in a state where the air bypass valve 135 is usually supposed to operate based upon satisfaction of the operating condition, so that the throttle-upstream-pressure excessively increases. This case threatens to induce occurrence of surge noises, damages of the intake pipe or the like. Therefore, in the second embodiment, the abnormal operation of the air bypass valve 135 is detected based upon a fluctuation in the throttle-upstream-pressure to issue a warning in response thereto upon occurrence of the abnormal operation and also take such a measure as to lower the maximum guard of the supercharging pressure.

Figure 10:
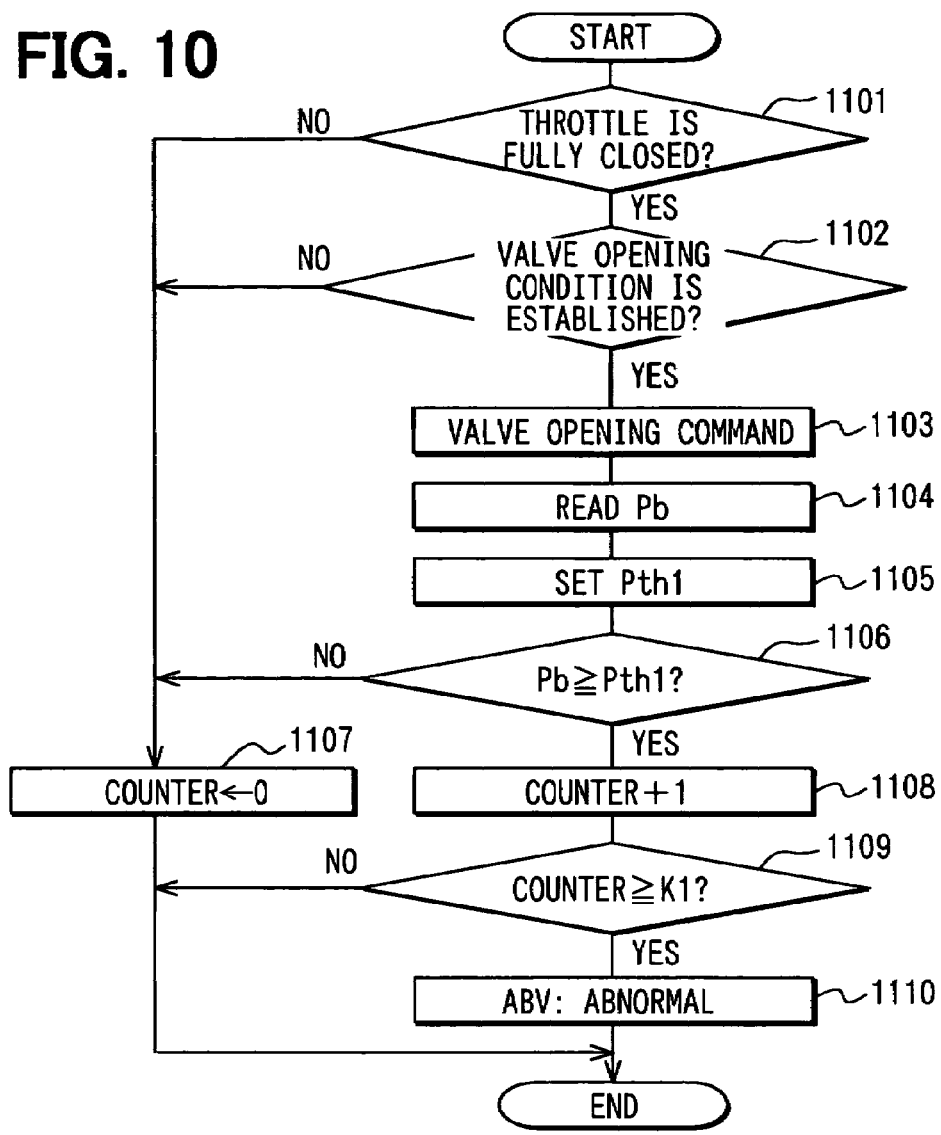
FIG. 10 is a flow chart showing an abnormality determining process in an air bypass valve.

FIG. 10 is a flow chart showing an abnormality determining process for the air bypass valve 135 and this process is repeatedly executed at a predetermined time cycle by the ECU 150.

In FIG. 10, at step 1101 it is determined whether or not the throttle valve 114 is in a fully closed state. At this time, when the throttle valve 114 is operated to the fully closed position during deceleration of a vehicle, it is detected that the throttle valve 114 is in a fully closed condition based upon a detection signal of the throttle valve opening sensor. At subsequent step 1102, it is determined whether or not a valve opening condition of the air bypass valve 135 is established. This valve opening condition is determined based upon a supercharging condition by the supercharger 130 at a point when the throttle valve 114 is fully closed. When a difference in pressure between the throttle-upstream-pressure (supercharging pressure) and an atmospheric pressure is more than a predetermined value, it is determined that the valve opening condition of the air bypass valve 135 is met. In a case where the determination result at both steps 1101 and 1102 is "YES", at each subsequent step, the air bypass valve 135 is opened and also an abnormality determination is made as to the air bypass valve 135.

That is, at step 1103, a valve opening command is outputted to the air bypass valve 135 and then, at step 1104 a throttle-upstream-pressure Pb calculated from the detection result of the supercharging pressure sensor 112 located at the upstream side of the throttle valve 114 is read in under a state after the valve opening command of the air bypass valve 135 is outputted. Thereafter, at step 1105, a pressure determination value Pth1 for executing an abnormality determination of the air bypass valve 135 is set by using the throttle-upstream-pressure Pb as an abnormality determination parameter. At this point, the pressure determination value Pth1 is set according to a changing pattern of the throttle-upstream-pressure at a state where the air bypass valve 135 is opened after the throttle valve 114 is fully closed. In the second embodiment, the pressure determination value Pth1 is set based upon a difference in pressure between a throttle-upstream-pressure at the time of outputting the valve opening command of the air bypass valve 135 and an atmospheric pressure, and time which has elapsed after the air bypass valve 135 is opened.

Figure 11:
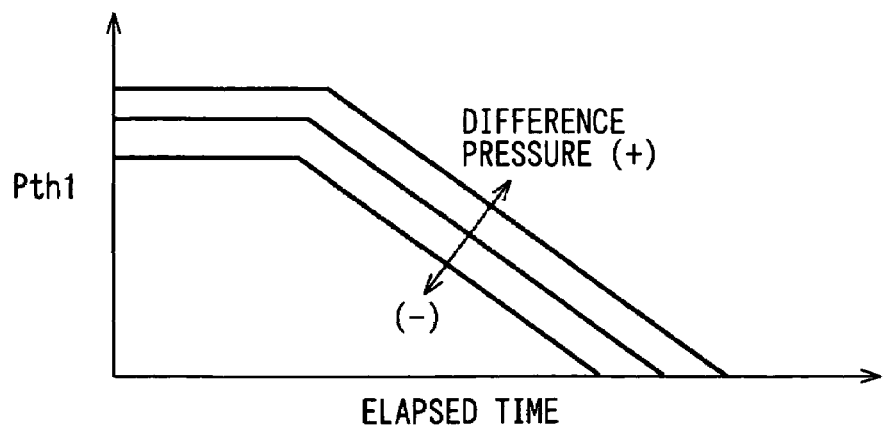
FIG. 11 is a graph for explaining a pressure determination value Pth1.

In detail, as shown in FIG. 11, the pressure determination value Pth1 is set as a larger value as the difference in pressure between the throttle-upstream-pressure at the time of outputting the valve opening command of the air bypass valve 135 and the atmospheric pressure increases, and also is set so as to reduce at a predetermined rate according to the time elapse after outputting the valve opening command to the air bypass valve 135. In addition, after the air bypass valve 135 is opened, the throttle-upstream-pressure is reduced at a changing rate defined by an intake system (including the bypass passage 134 and the air bypass valve 135). Therefore, an inclination of the pressure determination value Pth1 is defined according to the changing rate.

A difference pressure value (difference in pressure between the throttle-upstream-pressure and the atmospheric pressure) used for setting the pressure determination value Pth1 may be simply replaced by the throttle-upstream-pressure. As methods of reducing the pressure determination value Pth1 as time goes, in addition to a method of reducing it at a constant changing rate as shown in FIG. 11, a method of reducing it at a nonlinear rate or a stepwise rate may be used.

In addition, at step 1106, the then-throttle-upstream-pressure Pb and the pressure determination value Pth1 are compared to determine whether or not $Pb \geq Pth1$. In a case where $Pb < Pth1$, the process goes to step 1107, wherein after a pressure excess counter is cleared to be "0", this routine ends. In a case where $Pb \geq Pth1$, the process goes to step 1108, wherein the pressure excess counter is incremented by "1". At subsequent step 1109, it is determined whether or not a value of the pressure excess counter is more than a predetermined determination value K1. When the value of the counter$\geq$K1, the process goes to step 1110, wherein it is determined that the air bypass valve 135 is abnormal and thereafter, this routine ends.

When it is determined that the air bypass valve 135 is abnormal, the ECU 150 executes each of the following processes as a failsafe process.

(1) To store failure diagnosis information (dialog code or the like) showing that the air bypass valve 135 is abnormal in a memory for backup formed of an EEPROM or a backup RAM in the ECU 150.

(2) To light a warning lamp (so-called MIT lamp).

(3) To lower the maximum guard value of a supercharging pressure by the turbocharger 130.

Figure 12:
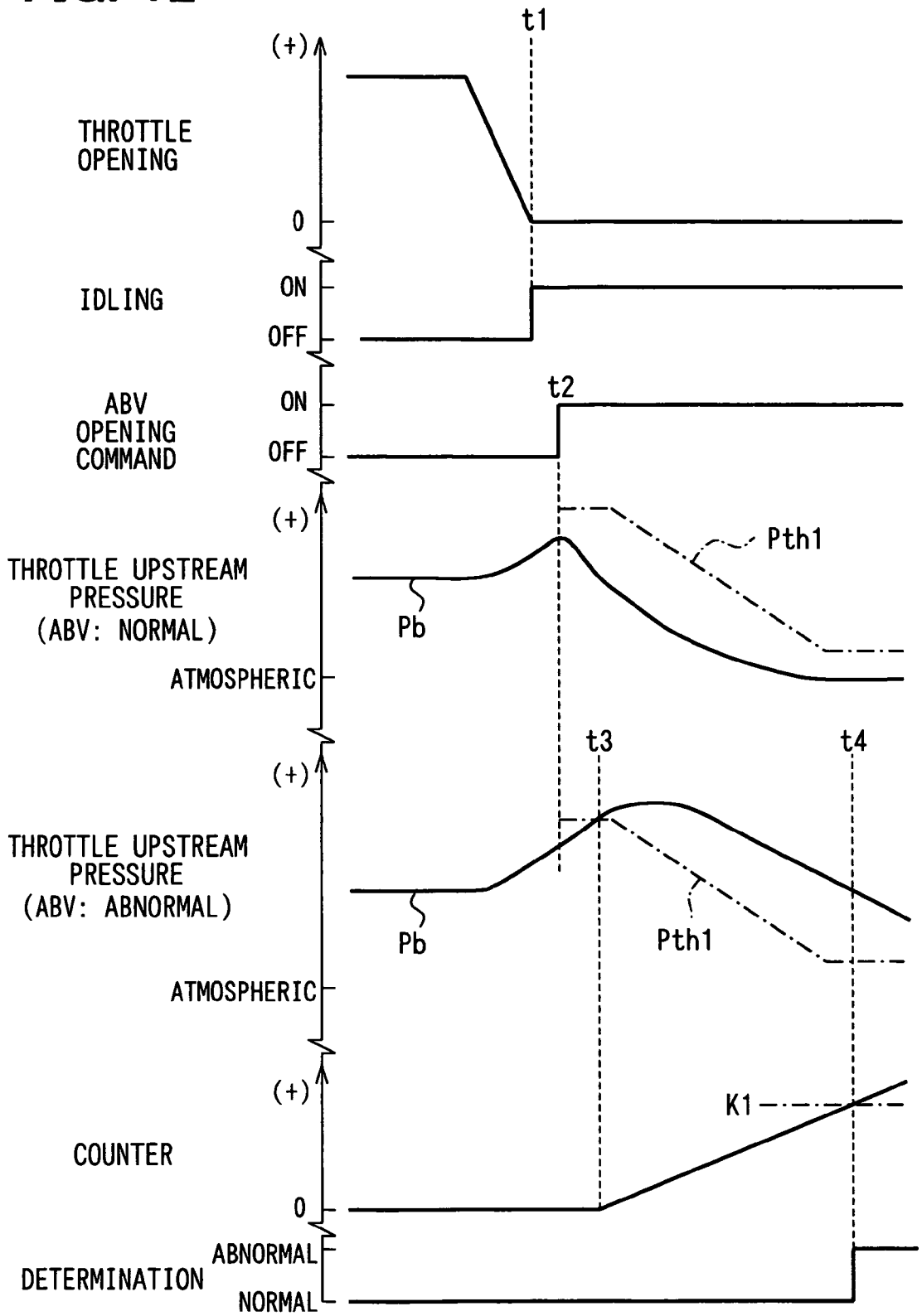
FIG. 12 is a time chart showing an abnormality detection operation of the air bypass valve during deceleration of a vehicle.

Next, an abnormality detection operation of the air bypass valve 135 during deceleration of a vehicle will be in more detail explained with reference to a time chart in FIG. 12. FIG. 12 shows two types of pressure fluctuation, one at a normal ABV and the other at an abnormal ABV. The pressure excess counter and the abnormality determination result shown under the throttle-upstream-pressure in FIG. 12 are ones at the abnormal ABV.

In FIG. 12, it is determined that a vehicle is in an idling condition based upon the event that an opening of the throttle valve 114 is reduced according to deceleration of the vehicle and at timing t1, the throttle valve 114 is fully closed (the opening of the throttle valve 114=0). Thereafter, at timing t2, a valve opening command is outputted to the air bypass valve 135. At this time, if the air bypass valve 135 is normally opened, the throttle-upstream-pressure Pb starts to gradually increase due to reduction of the opening of the throttle valve 114 and changes to reduce due to the opening of the air bypass valve 135. Thereafter, the throttle-upstream-pressure Pb is reduced to an atmospheric pressure.

At the normal operation of the air bypass valve 135 as described above, the throttle-upstream-pressure Pb does not exceed the pressure determination value Pth1. Accordingly, the pressure excess counter is not incremented. The air bypass valve 135 is again forced to be in a closed state after the throttle-upstream-pressure Pb is reduced and is stable at an atmospheric pressure (illustration is omitted).

On the other hand, at the abnormal operation of the air bypass valve 135, even if the valve opening command is outputted to the air bypass valve 135 at timing t2, the air bypass valve 135 is not opened. Therefore, the throttle-upstream-pressure Pb continues to increase after timing t2 and the throttle-upstream-pressure Pb exceeds the pressure determination value Pth1 after timing t3. An increase in the throttle-upstream-pressure Pb after timing t2 is caused by inertia rotation of the compressor impeller 131. Therefore, the throttle-upstream-pressure Pb reaches a peak value once and thereafter, gradually reduces. When Pb≧Pth1 as described above, the pressure excess counter is counted up and a determination is made as to occurrence of an abnormality of the air bypass valve 135 at timing t4 where the counter value reaches a predetermined value K1.

According to the second embodiment as described in detail above, a determination is made as to the abnormality of the air bypass valve 135, based upon a fluctuation of the throttle-upstream-pressure Pb after outputting the valve opening command to the air bypass valve 135. As a result, the abnormality of the air bypass valve 135 is properly detected, leading to protection of the system. In this case, both an electrical abnormality and a mechanical abnormality of the air bypass valve 135 can be properly detected.

Since the maximum guard value of the supercharging pressure by the supercharger 130 is lowered upon occurrence of the abnormality in the air bypass valve 135, it is possible to restrict excessive increase of the throttle-upstream-pressure during deceleration of the vehicle (at a fully closed position of the throttle valve 114), thus securely protecting the supercharging pressure control system.

Third Embodiment

In the second embodiment, after the throttle valve 114 is fully closed, the pressure determination value Pth1 is set according to the changing pattern of the throttle-upstream-pressure caused by the opening of the air bypass valve 135 and also at a state when the throttle-upstream-pressure is more than the pressure determination value Pth1, an abnormality determination of the air bypass valve 135 is made based upon continuation time of this state. However, in the third embodiment, the above abnormality determination method is altered. That is, differences in pressure between the throttle-upstream-pressure Pb and the pressure determination value Pth1 are integrated to execute an abnormality determination of the air bypass valve 135 based upon an integration value of the pressure differences.

Figure 13:
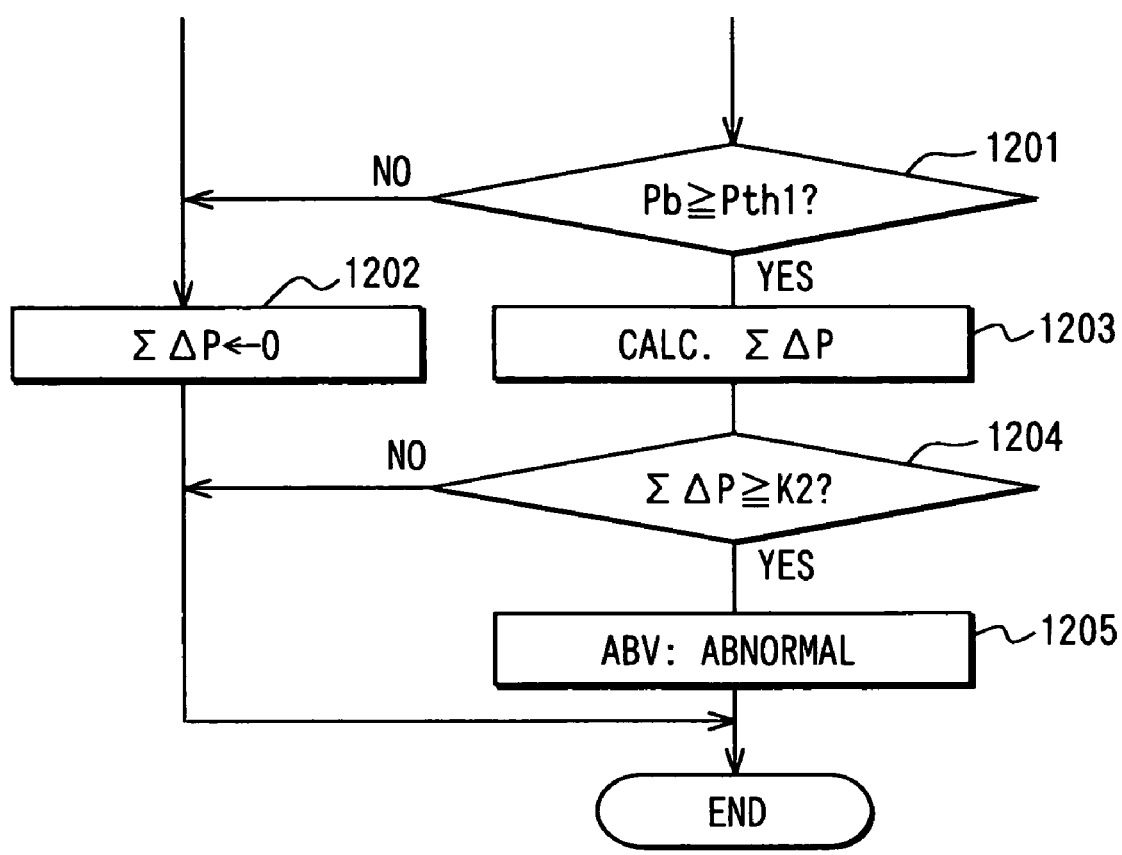
FIG. 13 is a flow chart showing an abnormality determining process in an air bypass valve in a third embodiment of the present invention.

As for a calculation process of the ECU 150, the process of steps 1106 to 1110 in FIG. 10 is altered into the process shown in FIG. 13. That is, in FIG. 13, at step 1201, it is determined whether or not the current throttle-upstream-pressure Pb is more than the pressure determination value Pth1 (the same as the step 1106 in FIG. 10). When Pb<Pth1, the process goes to step 1202, wherein after the integration value of the pressure difference ΣΔP is cleared to be "0", this routine ends. When Pb≧Pth1, the process goes to step 1203.

At step 1203, the pressure difference ΔP(=Pb−Pth1) between the throttle-upstream-pressure Pb and the pressure determination value Pth1 is calculated and also the pressure difference ΔP is added to the previous value of the integration value of the pressure difference ΣΔP to calculate this time's value of an integration value of the pressure difference ΣΔP. Then, at step 1204, it is determined whether or not the integration value of the pressure difference ΣΔP is equal to a predetermined determination value K2 or more. When ΣΔP≧K2, the process goes to step 1205, wherein it is determined that the air bypass valve 135 is abnormal.

Figure 14:
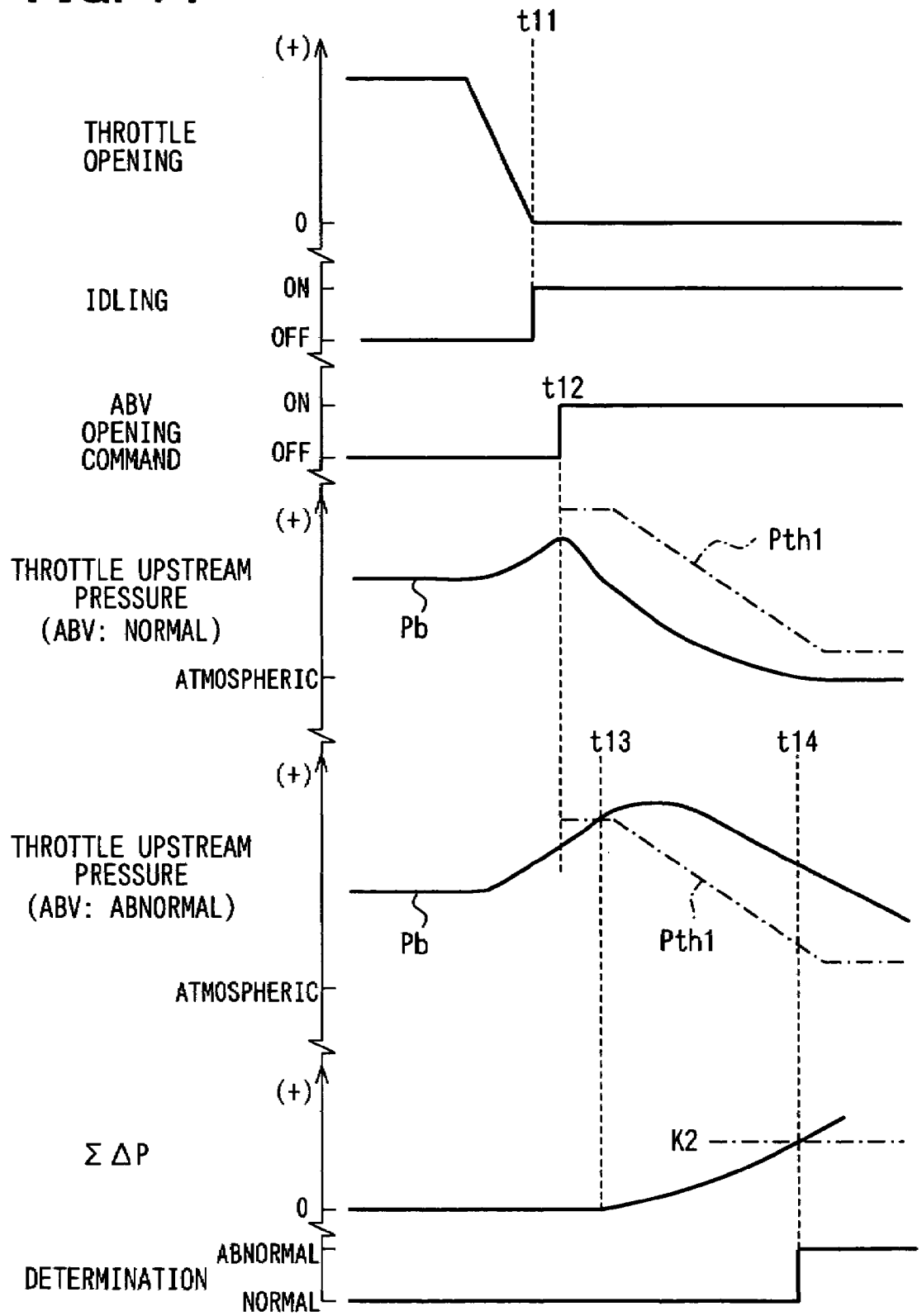
FIG. 14 is a time chart showing an abnormality detection operation of the air bypass valve during deceleration of a vehicle in the third embodiment of the present invention.

FIG. 14 is a time chart showing an abnormality detecting operation of the air bypass valve 135 during deceleration of a vehicle. In FIG. 14, a throttle valve opening, a valve opening command of the air bypass valve 135 and a change in throttle-upstream-pressure Pb at a normal operation and an abnormal operation of the air bypass valve 135 are the same as in FIG. 12.

In FIG. 14, after the throttle valve 114 is fully closed (throttle valve opening=0) at timing t11, a valve opening command is outputted to the air bypass valve 135 at timing t12. At this point, if the air bypass valve 135 is normally opened, the throttle-upstream-pressure Pb gradually starts to increase in response to reduction of the throttle valve opening and then, changes to reduce caused by opening the air bypass valve 135. As a result, the throttle-upstream-pressure Pb does not exceed the pressure determination value Pth1 and the integration value of the pressure difference ΣΔP remains to 0.

On the other hand, at an abnormal operation of the air bypass valve 135, even if the valve opening command is outputted to the air bypass valve 135 at timing t12, the air bypass valve 135 does not open. Therefore, due to increase in the throttle-upstream-pressure, after timing t13 the throttle-upstream-pressure Pb exceeds the pressure determination value Pth1 and the integration value of the pressure difference ΣΔP is calculated as shown in FIG. 14. In addition, when ΣΔP≧K2 at timing t14, occurrence of the abnormality in the air bypass valve 135 is determined.

According to the third embodiment as described above, the abnormality of the air bypass valve 135 is appropriately detected in the same as in the second embodiment, resulting in protecting the supercharging pressure system.

Fourth Embodiment

In each of the above-mentioned embodiments, after the throttle valve is fully closed, the pressure determination value Pth1 is set according to the changing pattern of the throttle-upstream-pressure Pb caused by the opening of the air bypass valve 135. However, the fourth embodiment is different from the above-mentioned and sets a pressure determination value Pth2 which does not change with time. If a throttle-upstream-pressure Pb is more than a predetermined level when a predetermined time elapses from a point a valve opening command of the air bypass valve 135 is outputted, it is determined that an abnormality of the air bypass valve 135 occurs.

Figure 15:
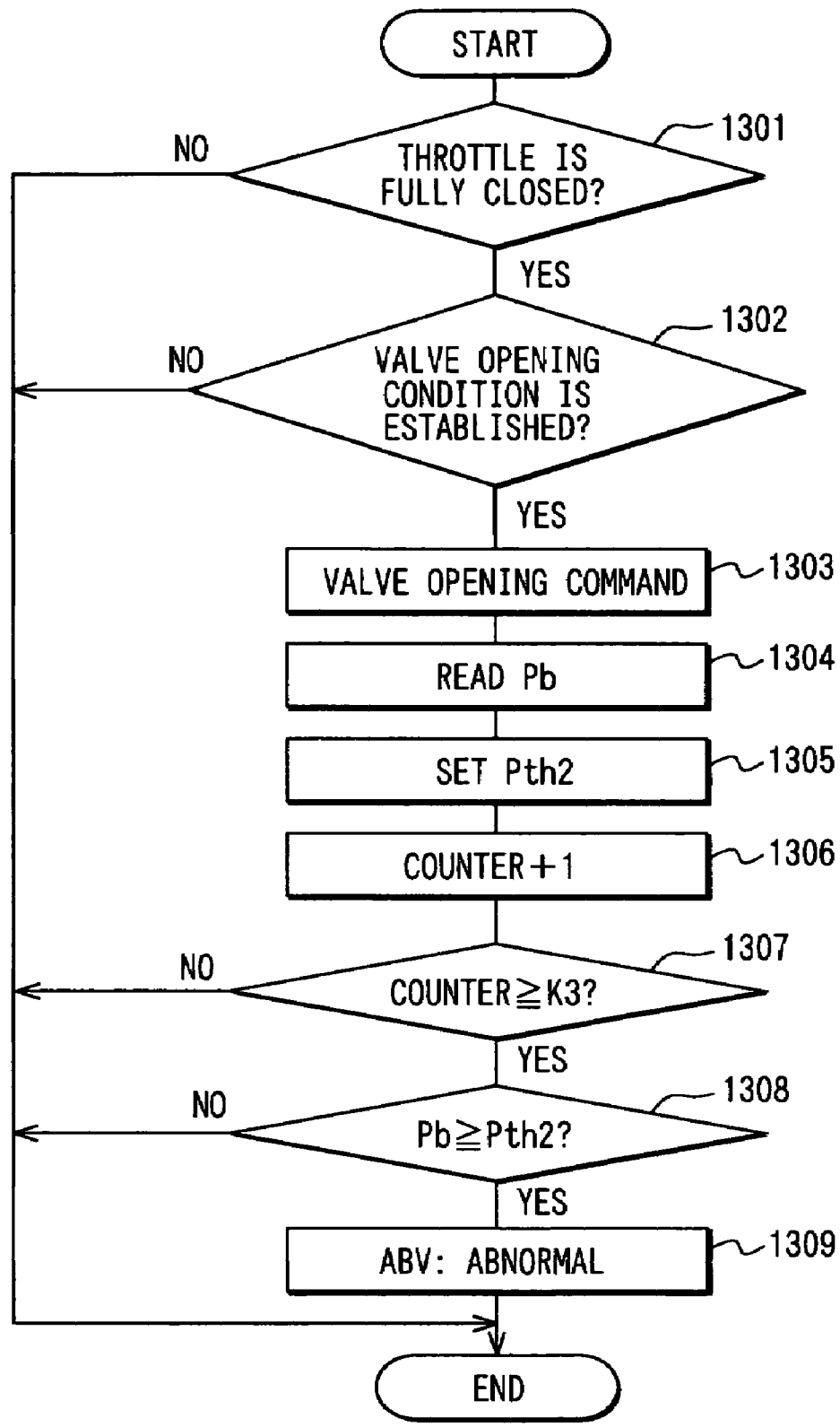
FIG. 15 is a flow chart showing an abnormality determining process in an air bypass valve in a fourth embodiment of the present invention.

In regard to the calculation process of the ECU 150, the process shown in FIG. 15 will be executed instead of the process in FIG. 10 or FIG. 13. However, steps 1301 to 1304 are the same as steps 1101 to 1104 in FIG. 10 and therefore, the explanation thereof is simplified.

In FIG. 15, a valve opening command is outputted to the air bypass valve 135 on condition that the throttle valve 114 is fully closed and a valve opening condition of the air bypass valve 135 is met. Further, a throttle-upstream-pressure Pb calculated from the detection result of the supercharging pressure sensor 112 is read in (steps 1301 to 1304). Thereafter, at step 1305, a pressure determination value Pth2 for executing an abnormality determination of the air bypass valve 135 is set by using the throttle-upstream-pressure Pb as an abnormality determination parameter. At this point, the pressure determination value Pth2 is different from the pressure determination value Pth1 which is determined based upon the changing pattern of the throttle-upstream-pressure and is a constant value regardless of time change. However, the pressure determination value Pth2 may be set based upon a difference in pressure between a throttle-upstream-pressure at the time of outputting the valve opening command of the air bypass valve 135 and an atmospheric pressure. In more detail, as the difference in pressure between the throttle-upstream-pressure and the atmospheric pressure becomes larger, the pressure determination value Pth2 is set to be larger.

Thereafter, at step 1306, a time elapse counter for counting an elapse time after the valve opening command of the air bypass valve 135 is outputted is incremented by "1". Then, at step 1307, it is determined whether or not a value of the time elapse counter is equal to a predetermined determination value K3 or more. When the counter value≧K3, the process goes to step 1308, wherein it is determined whether or not the current throttle-upstream-pressure Pb is equal to the pressure determination value Pth2 or more. When Pb<Pth2, this routine ends. When Pb≧Pth2, the process goes to step 1309, wherein it is determined that the air bypass valve 135 is abnormal.

Figure 16:
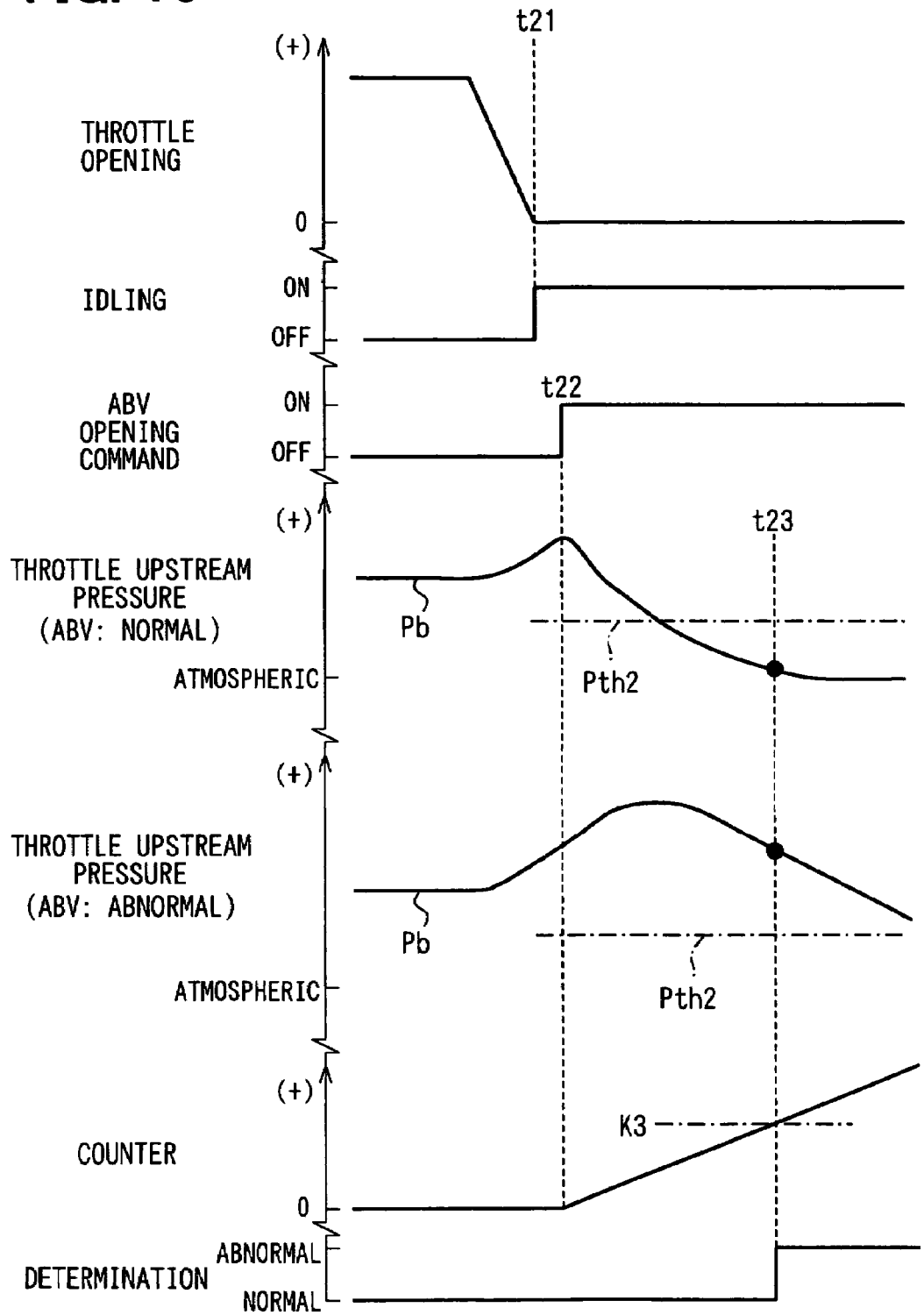
FIG. 16 is a time chart showing an abnormality detection operation of the air bypass valve during deceleration of a vehicle in the fourth embodiment of the present invention.

FIG. 16 is a time chart showing abnormality detecting operation of the air bypass valve 135 during deceleration of a vehicle. In FIG. 14, a throttle valve opening, a valve opening command of the air bypass valve 135 and a change in a throttle-upstream-pressure Pb at a normal operation and an abnormal operation of the air bypass valve 135 are the same as in FIG. 12.

In FIG. 16, after the throttle valve 114 is fully closed (throttle valve opening=0) at timing t21, a valve opening command is outputted to the air bypass valve 135 at timing t22. At this point, if the air bypass valve 135 is normally opened, the throttle-upstream-pressure Pb gradually starts to increase in response to reduction of the throttle valve opening and then, changes to reduce caused by the opening of the air bypass valve 135. As a result, at timing t23 (timing when a value of the time elapse counter becomes the predetermined value K3) when a predetermined time elapses after the valve opening command is outputted to the air bypass valve 135, the throttle-upstream-pressure Pb is less than the pressure determination value Pth2.

On the other hand, at an abnormal operation of the air bypass valve 135, even if the valve opening command is outputted to the air bypass valve 135 at timing t22, the air bypass valve 135 does not open. Therefore, at timing t23 when throttle-upstream-pressure Pb excessively increases and a predetermined time elapses after a valve opening command is outputted to the air bypass valve 135, the throttle-upstream-pressure Pb is equal to the pressure determination value Pth2 or more. Thereby, occurrence of the abnormality in the air bypass valve 135 is determined.

In the fourth embodiment as described above, an abnormality of the air bypass valve 135 is appropriately detected in the same as in the second embodiment, resulting in protecting the supercharging pressure system.

However, the present invention is not limited to the descriptions of the above embodiments, but may be carried out as follows.

An abnormality determination of the air bypass valve 135 may be made based upon degrees of an increase in the throttle-upstream-pressure caused by an inertia operation of the turbocharger 130 after a valve opening command is outputted to the air bypass valve 135. More specially, at a point (or immediately before) of outputting the valve opening command of the air bypass valve 135, an increase amount in the throttle-upstream-pressure from the throttle-upstream-pressure Pb is obtained. The occurrence of the abnormality is determined at a point the increase amount exceeds a predetermined value. Alternatively, the occurrence of the abnormality is determined at a point a difference in pressure between a throttle-upstream-pressure Pb at a point (or immediately before) of outputting the valve opening command of the air bypass valve 135 and a peak value of the throttle-upstream-pressure Pb after the valve opening command is outputted exceeds a predetermined value. In this case, since the abnormality determination of the air bypass valve 135 may be made for an increased duration of the throttle-upstream-pressure caused by an inertia operation of the turbocharger 130, a quick abnormality determination can be made.

In the fourth embodiment as described above, it is explained that the pressure determination value Pth2 may be variably set based upon the difference in pressure between the throttle-upstream-pressure at a point of outputting the valve opening command of the air bypass valve 135 and the atmospheric pressure. Instead of variably setting the pressure determination value Pth2, however, a determination value K3 for determining a value of the time elapse counter (counter for counting an elapse time after the opening of the air bypass valve 135) may be variably set based upon a difference in pressure between the throttle-upstream-pressure at a point of outputting a valve opening command of the air bypass valve 135 and an atmospheric pressure. In this construction also, the excellent effect can be achieved in the same way as in the above-mentioned.

In addition, in the construction of setting a pressure determination value Pth2 which does not change with time as described in the fourth embodiment, an elapse time from a point a valve opening command is outputted to the air bypass valve 135 until a point a throttle-upstream-pressure Pb is reduced to a pressure determination value Pth2 is counted and an abnormality determination of the air bypass valve 135 may be made based upon the elapse time.

In a case where the air bypass valve 135 is abnormal, a difference in degree of the abnormality possibly occurs, for example, an abnormality that the air bypass valve 135 is stuck in a fully closed state or in a half-opened state. A fluctuation in the throttle-upstream-pressure differs in each abnormality. Accordingly, the degree in abnormality of the air bypass valve 135 is determined based upon the fluctuation in the throttle-upstream-pressure after outputting the valve opening command to the air bypass valve 135 and the maximum guard value of the supercharging pressure may be variably set based upon the degree in abnormality. Thereby, at the time of occurrence of the abnormality, an appropriate supercharging pressure guard can be applied as needed.

As a method of determining the degree in abnormality of the air bypass valve 135, there is considered a method of determining the degree from an integral value (ΣΔP as described above) of differences in pressure between the throttle-upstream-pressure after the valve opening command is outputted and the pressure determination value, from a peak value of the throttle-upstream-pressure after the valve opening command is outputted, or from an elapse time from a point when the valve opening command is outputted until a point when the throttle-upstream-pressure is reduced to a predetermined pressure value.

In the embodiment as described above, the valve opening command is outputted to the air bypass valve 135 by determining that the operating condition of the air bypass valve 135 is met, based upon the event that the intake air by the turbocharger 130 is in a supercharging state and also the throttle valve 114 is fully closed for deceleration of a vehicle. Besides, it is determined that the operating condition is met, based upon a case where the supercharging pressure by the turbocharger 130 excessively increases (in a case where the excessive supercharging state occurs), and thereby a valve opening command may be outputted to the air bypass valve 135.

The air bypass valve 135 may be constructed so that an opening thereof is adjustable. For example, the air bypass valve 135 is constructed so as to include a linear solenoid, where a position of a valve body of the air bypass valve 135 may be adjusted in response to a control signal from the ECU to adjust an opening of the air bypass valve 135.

In the embodiment as described above, the air bypass valve 135 as a bypass valve is of an electromagnetic driven type and is opened/closed by an electrical valve opening command form the ECU 150. In place of this, however, a mechanical air bypass valve using a diaphragm or the like may be adopted. For example, a diaphragm type moving portion is provided to define two pressure chambers (first pressure chamber and second pressure chamber) by the diaphragm and also a throttle downstream pressure is introduced to the first pressure chamber and a throttle-upstream-pressure (supercharging pressure) is introduced to the second pressure chamber. In addition, the valve body is usually retained in a closed position by the pressure (the throttle downstream pressure) in the first pressure chamber and the urging force of a coil spring or the like, and upon an increase in the throttle-upstream-pressure, the valve body is moved to an opened position by the pressure (throttle-upstream-pressure) in the second pressure chamber.

In a case of adopting the mechanical air bypass valve as described above, the air bypass valve operates (opens) due to an increase in the throttle-upstream-pressure on condition that the intake air by the turbocharger is in a supercharging state and the throttle valve is fully closed for deceleration of a vehicle. In addition, in a case where the supercharging pressure by the turbocharger excessively increases (in a case where the excessive supercharging pressure state occurs), the air bypass valve operates (opens) due to an increase of the throttle-upstream-pressure. In this construction also, an abnormality of the bypass valve can be determined based upon the fluctuation in the throttle-upstream-pressure after the operating condition is met as described above.

While only the selected preferred embodiments have been chosen to illustrate the present invention, it will be apparent to those skilled in the art from this disclosure that various changes and modifications can be made therein without departing from the scope of the invention as defined in the appended claims. Furthermore, the foregoing description of the preferred embodiments according to the present invention is provided for illustration only, and not for the purpose of limiting the invention as defined by the appended claims and their equivalents.

What is claimed is:

1. An abnormality diagnosis apparatus for a supercharging pressure control system including a throttle valve located in an intake system to adjust an intake air quantity, a supercharger located upstream of the throttle valve in the intake system to supercharge intake air, and a bypass valve located in a passage bypassing the supercharger in the intake system, the bypass valve being opened when a predetermined operating condition is established, the abnormality diagnosis apparatus comprising:

a pressure monitoring means which monitors a pressure upstream of the throttle valve over a period of time; and an abnormality determination means which determines whether or not there occurs abnormality of the bypass valve based on the pressure monitored by the pressure monitoring means after the operating condition is established with the throttle valve fully closed.

2. The abnormality diagnosis apparatus for the supercharging pressure control system according to claim 1, wherein the abnormality determination means sets a pressure determination value based upon a reduction pattern of the pressure upstream of the throttle valve after the bypass valve is opened, and determines that the abnormality of the bypass valve occurs when the throttle-upstream-pressure is greater than the pressure determination value, a state of which continues for a predetermined time.

3. The abnormality diagnosis apparatus for the supercharging pressure control system according to claim 1, wherein the abnormality determination means sets a pressure determination value based upon a reduction pattern of the pressure upstream of the throttle valve after the bypass valve is opened, and determines that the abnormality of the bypass valve occurs when the pressure upstream of the throttle valve is greater than the pressure determination value and also an integrated value of differences in pressure between the pressure upstream of the throttle valve and the pressure determination value is greater than a predetermined value.

4. The abnormality diagnosis apparatus for the supercharging pressure control system according to claim 2, wherein the pressure determination value is variably set based upon the pressure upstream of the throttle valve at a time when the operating condition is met.

5. The abnormality diagnosis apparatus for the supercharging pressure control system according to claim 2, wherein the pressure determination value is variably set based upon an elapse time from a time when the operating condition is met.

6. The abnormality diagnosis apparatus for the supercharging pressure control system according to claim 1, wherein:
the abnormality determination means determines that the abnormality of the bypass valve occurs if the pressure upstream of the throttle valve at a time a predetermined time elapses after the operating condition is met is more than a predetermined level.

7. The abnormality diagnosis apparatus for the supercharging pressure control system according to claim 1, wherein:
the abnormality determination means determines whether or not the abnormality of the bypass valve occurs based upon the degree of an increase in the pressure upstream of the throttle valve caused by inertia running of the supercharger after the operating condition is met.

8. The abnormality diagnosis apparatus for the supercharging pressure control system according to claim 1, wherein:
when the abnormality determination means determines that the abnormality of the bypass valve occurs, a maximum guard of a supercharging pressure by the supercharger is reduced.

9. The abnormality diagnosis apparatus for the supercharging pressure control system according to claim 8, wherein:
the abnormality determination means determines the degree of the abnormality of the bypass valve based upon the fluctuation in the pressure upstream of the throttle valve after the operating condition is met, and variably sets the maximum guard of the supercharging pressure in accordance with the degree.

10. An abnormality diagnosis method for a supercharging pressure control system provided with a throttle valve located in an intake system to adjust an intake air quantity, a supercharger located in the intake system upstream of the throttle valve to supercharge intake air, and a bypass valve located in a passage bypassing the supercharger in the intake system, the supercharging pressure control system opening the bypass valve when a predetermined operating condition is met, the abnormality diagnosis method comprising:

monitoring a pressure upstream of the throttle valve over a period of time; and determining whether or not there occurs abnormality of the bypass valve based upon the monitored pressure upstream of the throttle valve after the operating condition is met with the throttle valve fully closed.

11. The abnormality diagnosis method for the supercharging pressure control system according to claim 10, further comprising:

setting a pressure determination value based upon a reduction pattern of the pressure upstream of the throttle valve after the bypass valve is opened, wherein:

the occurrence of the abnormality of the bypass value is determined when the pressure upstream of the throttle valve is greater than the pressure determination value, a state of which continues for a predetermined time.

12. The abnormality diagnosis method for the supercharging pressure control system according to claim 10, further comprising:

setting a pressure determination value based upon a reduction pattern of the pressure upstream of the throttle valve after the bypass valve is opened, wherein:

the occurrence of the abnormality of the bypass valve is determined when the pressure upstream of the throttle valve is greater than the pressure determination value and also an integrated value of differences in pressure between the pressure upstream of the throttle valve and the pressure determination value is greater than a predetermined value.

13. The abnormality diagnosis method for the supercharging pressure control system according to claim 11, wherein:

the pressure determination value is variably set based upon the pressure upstream of the throttle valve when the operating condition is met.

14. The abnormality diagnosis method for the supercharging pressure control system according to claim 11, wherein:

the pressure determination value is variably set based upon an elapse time from a time when the operating condition is met.

15. The abnormality diagnosis method for the supercharging pressure control system according to claim 10, wherein:

the occurrence of the abnormality of the bypass valve is determined if the pressure upstream of the throttle valve at a time a predetermined time elapses after the operating condition is met is more than a predetermined level.

16. The abnormality diagnosis method for the supercharging pressure control system according to claim 10, wherein:

it is determined whether or not there occurs the abnormality of the bypass value, based upon the degree of an increase in the pressure upstream of the throttle valve caused by inertia running of the supercharger after the operating condition is met.

17. The abnormality diagnosis method for the supercharging pressure control system according to claim 10, further comprising:

reducing a maximum guard of a supercharging pressure by the supercharger when it is determined that the abnormality of the bypass value occurs.

18. The abnormality diagnosis method for the supercharging pressure control system according to claim 17, further comprising: determining the degree of the abnormality of the bypass valve based upon the monitored pressure upstream of the throttle valve after the operating condition is met; and variably setting the maximum guard of the supercharging pressure in accordance with the degree.

19. The abnormality diagnosis apparatus according to claim 1, wherein the pressure monitoring means monitors a fluctuation in the pressure upstream of the throttle valve over the period of time, and the abnormality determined by the abnormality determination means is determined based on the monitored fluctuation.

20. The method of claim 10, wherein a fluctuation in the pressure upstream of the throttle valve is monitored over a period of time, and the abnormality of the bypass valve is determined based on the monitored fluctuation.

* * * * *